(12) United States Patent
Huang et al.

(10) Patent No.: US 11,709,349 B2
(45) Date of Patent: Jul. 25, 2023

(54) OPTICAL IMAGING LENS ASSEMBLY

(71) Applicant: Zhejiang Sunny Optical Co., Ltd., Ningbo (CN)

(72) Inventors: Lin Huang, Ningbo (CN); Xin Zhou, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 426 days.

(21) Appl. No.: 16/864,416

(22) Filed: May 1, 2020

(65) Prior Publication Data

US 2020/0257091 A1 Aug. 13, 2020

Related U.S. Application Data

(63) Continuation of application No. PCT/CN2018/116309, filed on Nov. 20, 2018.

(30) Foreign Application Priority Data

May 15, 2018 (CN) .......................... 201810460752.4

(51) Int. Cl.
*G02B 13/02* (2006.01)
*G02B 9/62* (2006.01)
*G02B 13/00* (2006.01)

(52) U.S. Cl.
CPC ............... *G02B 13/02* (2013.01); *G02B 9/62* (2013.01); *G02B 13/0045* (2013.01)

(58) Field of Classification Search
CPC ............. G02B 27/012; G02B 27/0025; G02B 13/001; G02B 13/18; G02B 13/0055; G02B 13/0015; G02B 13/0045; G02B 3/04

USPC ....... 359/757, 759, 713, 745, 754, 751, 750, 359/766
See application file for complete search history.

(56) References Cited

U.S. PATENT DOCUMENTS

| | | |
|---|---|---|
| 4,139,265 A | 2/1979 | Matsui |
| 2008/0049335 A1 | 2/2008 | Tomioka |
| 2009/0009884 A1 | 1/2009 | Ohtake et al. |
| 2013/0215520 A1 | 8/2013 | Lai et al. |
| 2016/0178871 A1 | 6/2016 | You |
| 2016/0356989 A1 | 12/2016 | Kubota et al. |

(Continued)

FOREIGN PATENT DOCUMENTS

| | | |
|---|---|---|
| CN | 101295070 A | 10/2008 |
| CN | 101339290 A | 1/2009 |
| CN | 101354475 A | 1/2009 |

(Continued)

*Primary Examiner* — Travis S Fissel
(74) *Attorney, Agent, or Firm* — Barnes & Thornburg LLP

(57) ABSTRACT

The present disclosure discloses an optical imaging lens assembly including, sequentially from an object side to an image side along an optical axis, a first lens, a second lens, a third lens, a fourth lens, a fifth lens, and a sixth lens. The first lens has a positive refractive power; the second lens has a negative refractive power; the third lens has a negative refractive power; the fourth lens has a refractive power, and an image-side surface thereof is a convex surface; the fifth lens has a negative refractive power, and an object-side surface thereof is a concave surface; and the sixth lens has a refractive power, and an object-side surface thereof is a concave surface. Here, an effective focal length f3 of the third lens and an effective focal length f of the optical imaging lens assembly satisfy $-3 < f3/f < -1.5$.

17 Claims, 11 Drawing Sheets

(56) References Cited

U.S. PATENT DOCUMENTS

| | | | |
|---|---|---|---|
| 2018/0024326 A1* | 1/2018 | Teraoka | G02B 9/62 359/713 |
| 2018/0081153 A1 | 3/2018 | Huang | |

FOREIGN PATENT DOCUMENTS

| | | |
|---|---|---|
| CN | 102985864 A | 3/2013 |
| CN | 105425370 A | 3/2016 |
| CN | 105572848 A | 5/2016 |
| CN | 106062611 A | 10/2016 |
| CN | 106199915 A | 12/2016 |
| CN | 106526790 A | 3/2017 |
| CN | 106526791 A | 3/2017 |
| CN | 106842503 A | 6/2017 |
| CN | 106873129 A | 6/2017 |
| CN | 107065129 A | 8/2017 |
| CN | 107065131 A | 8/2017 |
| CN | 107390350 A | 11/2017 |
| CN | 107450157 A | 12/2017 |
| CN | 107515455 A | 12/2017 |
| CN | 107608058 A | 1/2018 |
| CN | 206946086 U | 1/2018 |
| CN | 107843977 A | 3/2018 |
| CN | 107991761 A | 5/2018 |
| CN | 108333723 A | 7/2018 |
| CN | 108375823 A | 8/2018 |
| GN | 107329234 | 11/2017 |
| GN | 107765394 | 3/2018 |
| JP | S61138225 A | 6/1986 |
| JP | H05249371 | 9/1993 |
| JP | 2018072762 A | 5/2018 |

\* cited by examiner

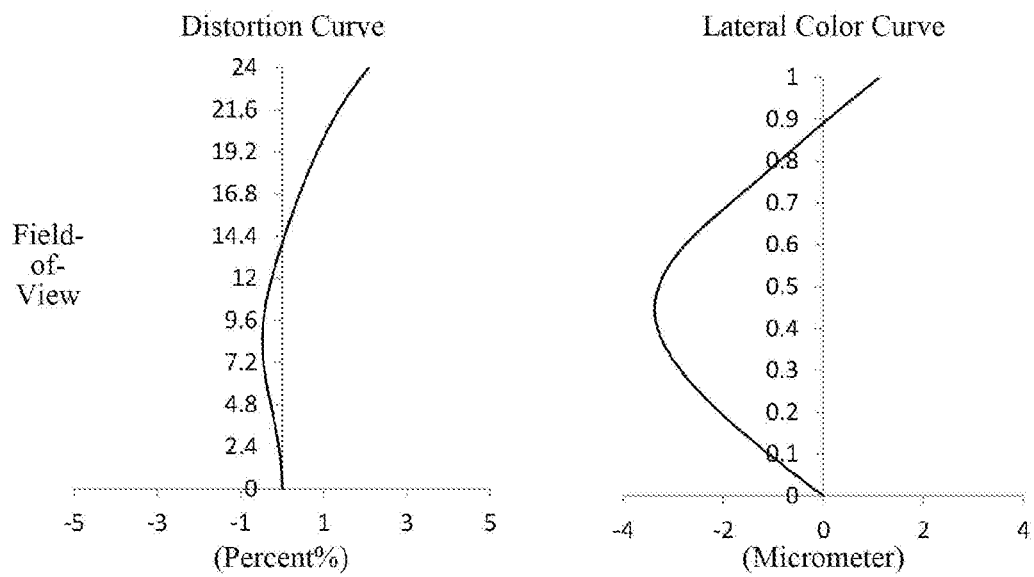
Fig. 6C
Fig. 6D
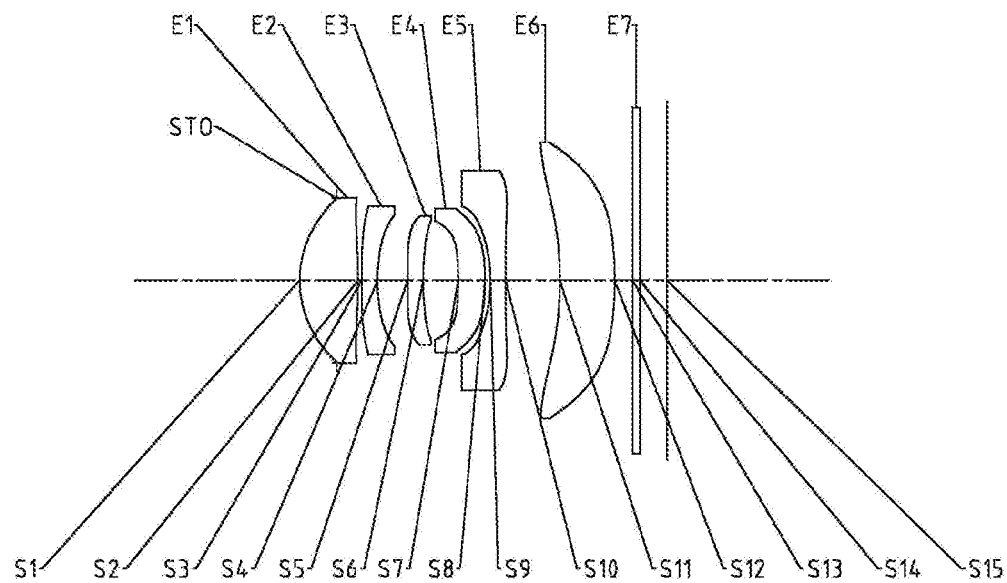
Fig. 7

OPTICAL IMAGING LENS ASSEMBLY

CROSS-REFERENCE TO RELATED APPLICATIONS

The present patent application is a continuation of International Application No. PCT/CN2018/116309, filed on Nov. 20, 2018, which claims priority to Chinese Patent Application No. 201810460752.4, filed before the China National Intellectual Property Administration (CNIPA) on May 15, 2018. Both of the aforementioned patent applications are hereby incorporated by reference in their entireties.

TECHNICAL FIELD

The present disclosure relates to an optical imaging lens assembly, and more specifically, relates to a telephoto lens assembly including six lenses.

BACKGROUND

With the continuous improvement of semiconductor process technology, the functions of smart phones are becoming more and more comprehensive. In terms of camera function, people hope that the mobile phone may have imaging capabilities similar to those of cameras, for example, may shoot the subject at distant, and may highlight main body and blur the background. This requires the mobile phone to be further equipped with an imaging lens assembly with a long focal length, good imaging quality, and small size.

The invention proposes a six-piece telephoto optical imaging lens assembly with aspheric, which may realize the zooming purpose by cooperating with a wide-angle lens assembly while ensuring the processing characteristics and miniaturization characteristics of the lens assembly. The optical imaging lens assembly may obtain higher magnification and good imaging effect in an auto-focus manner to be suitable for shooting objects at distant, and can enable customers to get different visual effects.

SUMMARY

The present disclosure provides an optical imaging lens assembly that is applicable to portable electronic products and at least solves or partially addresses at least one of the above disadvantages of the prior art.

In one aspect, the present disclosure provides an optical imaging lens assembly which includes, sequentially from an object side to an image side along an optical axis, a first lens, a second lens, a third lens, a fourth lens, a fifth lens and a sixth lens. The first lens may have a positive refractive power; the second lens may have a negative refractive power; the third lens may have a negative refractive power; the fourth lens may have a refractive power, and an image-side surface thereof may be a convex surface; the fifth lens may have a negative refractive power, and an object-side surface thereof may be a concave surface; and the sixth lens may have a refractive power, and an object-side surface thereof may be a concave surface. Here, an effective focal length f3 of the third lens and an effective focal length f of the optical imaging lens assembly may satisfy $-3<f3/f<-1.5$.

In one embodiment, the total effective focal length f of the optical imaging lens assembly and a distance TTL along the optical axis from an object-side surface of the first lens to an imaging plane of the optical imaging lens assembly may satisfy $TTL/f<1$.

In one embodiment, the effective focal length f3 of the third lens and an effective focal length f1 of the first lens may satisfy $-7<f3/f1<-4$.

In one embodiment, an image-side surface of the second lens may be a concave surface; and an effective focal length f2 of the second lens and a radius of curvature R4 of the image-side surface of the second lens may satisfy $-2<f2/R4<-1$.

In one embodiment, the total effective focal length f of the optical imaging lens assembly and an effective focal length f5 of the fifth lens may satisfy $-1.5<f/f5<-0.5$.

In one embodiment, an object-side surface of the first lens may be a convex surface; and an effective focal length f1 of the first lens and a radius of curvature R1 of the object-side surface of the first lens may satisfy $1<f1/R1<2$.

In one embodiment, an image-side surface of the first lens may be a convex surface; and a radius of curvature R2 of the image-side surface of the first lens and a radius of curvature R8 of the image-side surface of the fourth lens may satisfy $0<R8/R2<1$.

In one embodiment, a combined focal length f12 of the first lens and the second lens and a center thickness CT1 of the first lens along the optical axis may satisfy $4<f12/CT1<5$.

In one embodiment, a spaced interval T56 between the fifth lens and the sixth lens along the optical axis and a spaced interval T34 between the third lens and the fourth lens along the optical axis may satisfy $1.5<T56/T34<2.5$.

In one embodiment, an image-side surface of the sixth lens may be a convex surface; and a radius of curvature R9 of the object-side surface of the fifth lens and a radius of curvature R12 of the image-side surface of the sixth lens may satisfy $0<R9/R12<1$.

In one embodiment, a center thickness CT6 of the sixth lens along the optical axis and a center thickness CT4 of the fourth lens along the optical axis may satisfy $1.5<CT6/CT4<2.5$.

In one embodiment, an edge thickness ET5 at a maximum effective radius of the fifth lens and a center thickness CT5 of the fifth lens along the optical axis may satisfy $2<ET5/CT5<3$.

In one embodiment, an image-side surface of the third lens may be a concave surface; and a radius of curvature R6 of the image-side surface of the third lens and a radius of curvature R11 of the object-side surface of the sixth lens may satisfy $-1.8<R6/R11<-0.8$.

In one embodiment, half of a maximal field-of-view HFOV of the optical imaging lens assembly may satisfy $\tan(HFOV)<0.5$.

In another aspect, the present disclosure provides an optical imaging lens assembly which includes, sequentially from an object side to an image side along an optical axis, a first lens, a second lens, a third lens, a fourth lens, a fifth lens and a sixth lens. The first lens may have a positive refractive power; the second lens may have a negative refractive power; the third lens may have a negative refractive power; the fourth lens may have a refractive power, and an image-side surface thereof may be a convex surface; the fifth lens may have a negative refractive power, and an object-side surface thereof may be a concave surface; and the sixth lens may have a refractive power, and an object-side surface thereof may be a concave surface. Here, an effective focal length f3 of the third lens and an effective focal length f1 of the first lens may satisfy $-7<f3/f1<-4$.

In yet another aspect, the present disclosure also provides an optical imaging lens assembly which includes, sequentially from an object side to an image side along an optical axis, a first lens, a second lens, a third lens, a fourth lens, a fifth lens and a sixth lens. The first lens may have a positive refractive power; the second lens may have a negative refractive power; the third lens may have a negative refractive power; the fourth lens may have a refractive power, and an image-side surface thereof may be a convex surface; the fifth lens may have a negative refractive power, and an object-side surface thereof may be a concave surface; and the sixth lens may have a refractive power, and an object-side surface thereof may be a concave surface. Here, a radius of curvature R9 of the object-side surface of the fifth lens and a radius of curvature R12 of an image-side surface of the sixth lens may satisfy 0<R9/R12<1.

In yet another aspect, the present disclosure also provides an optical imaging lens assembly which includes, sequentially from an object side to an image side along an optical axis, a first lens, a second lens, a third lens, a fourth lens, a fifth lens and a sixth lens. The first lens may have a positive refractive power; the second lens may have a negative refractive power; the third lens may have a negative refractive power; the fourth lens may have a refractive power, and an image-side surface thereof may be a convex surface; the fifth lens may have a negative refractive power, and an object-side surface thereof may be a concave surface; and the sixth lens may have a refractive power, and an object-side surface thereof may be a concave surface. Here, a radius of curvature R6 of an image-side surface of the third lens and a radius of curvature R11 of the object-side surface of the sixth lens may satisfy −1.8<R6/R11<−0.8.

In yet another aspect, the present disclosure also provides an optical imaging lens assembly which includes, sequentially from an object side to an image side along an optical axis, a first lens, a second lens, a third lens, a fourth lens, a fifth lens and a sixth lens. The first lens may have a positive refractive power; the second lens may have a negative refractive power; the third lens may have a negative refractive power; the fourth lens may have a refractive power, and an image-side surface thereof may be a convex surface; the fifth lens may have a negative refractive power, and an object-side surface thereof may be a concave surface; and the sixth lens may have a refractive power, and an object-side surface thereof may be a concave surface. Here, an edge thickness ET5 at a maximum effective radius of the fifth lens and a center thickness CT5 of the fifth lens along the optical axis may satisfy 2<ET5/CT5<3.

In yet another aspect, the present disclosure also provides an optical imaging lens assembly which includes, sequentially from an object side to an image side along an optical axis, a first lens, a second lens, a third lens, a fourth lens, a fifth lens and a sixth lens. The first lens may have a positive refractive power; the second lens may have a negative refractive power; the third lens may have a negative refractive power; the fourth lens may have a refractive power, and an image-side surface thereof may be a convex surface; the fifth lens may have a negative refractive power, and an object-side surface thereof may be a concave surface; and the sixth lens may have a refractive power, and an object-side surface thereof may be a concave surface. Here, a combined focal length f12 of the first lens and the second lens and a center thickness CT1 of the first lens along the optical axis may satisfy 4<f12/CT1<5.

The present disclosure employs six lenses, and the optical imaging lens assembly has at least one advantageous effect such as long focal length, miniaturization and high image quality and the like by rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIG. 6C illustrates a distortion curve of the optical imaging lens assembly of the Example 3;

FIG. 6D illustrates a lateral color curve of the optical imaging lens assembly of the Example 3;

FIG. 7 illustrates a schematic structural view of an optical imaging lens assembly according to Example 4 of the present disclosure;

DETAILED DESCRIPTION OF EMBODIMENTS

Figure 1:
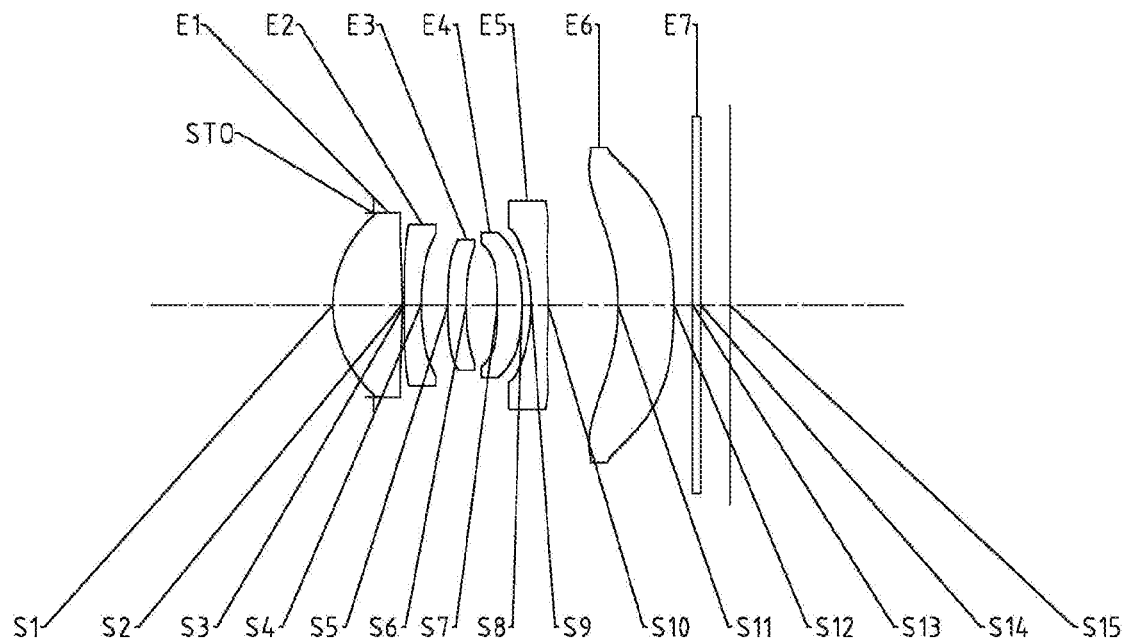
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface close to the object side is referred to as an object-side surface of the lens, and the surface close to the image side is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, six lenses having refractive power, i.e. a first lens, a second lens, a third lens, a fourth lens, a fifth lens and a sixth lens. The six lenses are arranged sequentially from an object side to an image side along an optical axis, and an air gap is provided between any adjacent lenses.

In an exemplary embodiment, the first lens may have a positive refractive power; the second lens may have a negative refractive power; the third lens may have a negative refractive power; the fourth lens has a positive refractive power or a negative refractive power, and an image-side surface thereof may be a convex surface; the fifth lens may have a negative refractive power, and an object-side surface thereof may be a concave surface; and the sixth lens has a positive refractive power or a negative refractive power, and an object-side surface thereof may be a concave surface.

In an exemplary embodiment, both of an object-side surface and an image-side surface of the first lens may be convex surfaces.

In an exemplary embodiment, an image-side surface of the third lens may be a concave surface.

In an exemplary embodiment, an image-side surface of the fifth lens may be a convex surface.

In an exemplary embodiment, an image-side surface of the sixth lens may be a convex surface.

In an exemplary embodiment, the optical imaging lens assembly according to the present disclosure may satisfy: $TTL/f<1$, where TTL is a distance along the optical axis from an object-side surface of the first lens to an imaging plane of the optical imaging lens assembly and f is an effective focal length of the optical imaging lens assembly. More specifically, TTL and f may further satisfy: $0.8<TTL/f<1$, for example, $0.90 \leq TTL/f \leq 0.91$. Satisfying the conditional expression $TTL/f<1$ helps to shorten the total length of the optical system and make the lens assembly thinner and lighter.

In an exemplary embodiment, the optical imaging lens assembly according to the present disclosure may satisfy: $-3<f3/f<-1.5$, where f3 is an effective focal length of the third lens and f is an effective focal length of the optical imaging lens assembly. More specifically, f3 and f may further satisfy: −2.66≤f3/f≤−1.74. By reasonably configuring the effective focal length of the third lens, the aberration may be corrected while the telephoto characteristic of the lens assembly is satisfied.

In an exemplary embodiment, the optical imaging lens assembly according to the present disclosure may satisfy: −7<f3/f1<−4, where f3 is an effective focal length of the third lens and f1 is an effective focal length of the first lens. More specifically, f3 and f1 may further satisfy: −6.5<f3/f1<−4.0, for example, −6.31≤f3/f1≤−4.18. Reasonably setting the ratio between the effective focal length of the third lens and the effective focal length of the first lens helps to achieve the telephoto characteristic of the system, and may improve the optical system's ability to converge light, adjust the light focusing position, and shorten the total length of the system.

In an exemplary embodiment, an image-side surface of the second lens may be a concave surface. A radius of curvature R4 of the image-side surface of the second lens and an effective focal length f2 of the second lens may satisfy −2<f2/R4<−1. More specifically, f2 and R4 may further satisfy: −1.8<f2/R4<−1.4, for example, −1.72≤f2/R4≤−1.48. By reasonably configuring the ratio between the effective focal length of the second lens and the radius of curvature of the image-side surface of the second lens (further, for example, ensuring the radius of curvature of the image-side surface of the second lens is positive, i.e. the image-side surface is a concave surface, in the case that the refractive power of the second lens is negative), the astigmatic of the system may be effectively compensated and the miniaturization of the optical system is further ensured.

In an exemplary embodiment, the optical imaging lens assembly according to the present disclosure may satisfy: −1.5<f/f5<−0.5, where f is a total effective focal length of the optical imaging lens assembly and f5 is an effective focal length of the fifth lens. More specifically, f and f5 may further satisfy: −1.38≤f/f5≤−0.61. Reasonably configuring the effective focal length of the fifth lens to ensure that the refractive power of the fifth lens is negative helps to increase the focal length of the optical system and achieve the telephoto characteristic of the system. At the same time, the system may be equipped with the function of adjusting the position of the light and may better compensate the field curvature.

In an exemplary embodiment, the optical imaging lens assembly according to the present disclosure may satisfy: 1<f1/R1<2, where f1 is an effective focal length of the first lens and R1 is a radius of curvature of an object-side surface of the first lens. More specifically, f1 and R1 may further satisfy: 1.5<f1/R1<1.7, for example, 1.55≤f1/R1≤1.63. By reasonably configuring the ratio between the effective focal length of the first lens and the radius of curvature of the object-side surface of the first lens (further, for example, ensuring the radius of curvature of the object-side surface of the first lens is positive, that is, the object-side surface is a convex surface, in the case that the refractive power of the first lens is positive), the angle of the light may be effectively adjusted, the astigmatic of the system may be effectively compensated, and the telephoto characteristic of the system is achieved.

In an exemplary embodiment, the optical imaging lens assembly according to the present disclosure may satisfy: 0<R8/R2<1, where R8 is a radius of curvature of the image-side surface of the fourth lens and R2 is a radius of curvature of an image-side surface of the first lens. More specifically, R8 and R2 may further satisfy: 0.2<R8/R2<0.9, for example, 0.38≤R8/R2≤0.79. By reasonably distributing the radius of curvature of the image-side surface of the fourth lens and the radius of curvature of the image-side surface of the first lens (further, for example, ensuring the image-side surface of the first lens is convex in the case that the image-side surface of the fourth lens is convex), the astigmatic of the system may be effectively compensated and the miniaturization of the optical system may be further ensured.

In an exemplary embodiment, the optical imaging lens assembly according to the present disclosure may satisfy: 0<R9/R12<1, where R9 is a radius of curvature of the object-side surface of the fifth lens and R12 is a radius of curvature of an image-side surface of the sixth lens. More specifically, R9 and R12 may further satisfy: 0.1<R9/R12<0.5, for example, 0.16≤R9/R12≤0.40. By reasonably distributing the radius of curvature of the object-side surface of the fifth lens and the radius of curvature of image-side surface of the sixth lens (further, for example, ensuring the image-side surface of the sixth lens is convex in the case that the object-side surface of the fifth lens is concave), the distortion of the system may be effectively compensated.

In an exemplary embodiment, the optical imaging lens assembly according to the present disclosure may satisfy: tan(HFOV)<0.5, where HFOV is half of a maximal field-of-view of the optical imaging lens assembly. More specifically, HFOV may further satisfy: 0.4<tan(HFOV)<0.5, for example, 0.43≤tan(HFOV)≤0.45. By reasonably controlling the half of a maximal field-of-view of the optical imaging lens assembly, the optical system may meet the telephoto characteristics and have a good ability to compensate aberrations. At the same time, the deflection angle of the chief ray may be reasonably controlled to improve the matching degree with the chip, thereby facilitating the adjustment of the structure of the optical system.

In an exemplary embodiment, the optical imaging lens assembly according to the present disclosure may satisfy: 1.5<CT6/CT4<2.5, where CT6 is a center thickness of the sixth lens along the optical axis and CT4 is a center thickness of the fourth lens along the optical axis. More specifically, CT6 and CT4 may further satisfy: 1.56≤CT6/CT4≤2.27. By reasonably configuring the ratio of the center thickness of the sixth lens and the fourth lens along the optical axis, the size of the optical system may be effectively reduced to avoid the optical imaging lens assembly having an excessively large size, and the difficulty of assembling the lens may be reduced and a higher space utilization rate may be achieved.

In an exemplary embodiment, the optical imaging lens assembly according to the present disclosure may satisfy: 2<ET5/CT5<3, where ET5 is an edge thickness at a maximum effective radius of the fifth lens and CT5 is a center thickness of the fifth lens along the optical axis. More specifically, ET5 and CT5 may further satisfy: 2.13≤ET5/CT5≤2.71. By reasonably controlling the edge thickness of the fifth lens and the center thickness of the fifth lens along the optical axis, the size of the system may be effectively reduced and the telephoto characteristics of the system may be met. At the same time, reasonably controlling the edge thickness of the fifth lens and the center thickness of the fifth lens along the optical axis also helps to adjust the system structure and reduce the difficulty of lens processing and assembly.

In an exemplary embodiment, the optical imaging lens assembly according to the present disclosure may satisfy: 4<f12/CT1<5, where f12 is a combined focal length of the first lens and the second lens and CT1 is a center thickness of the first lens along the optical axis. More specifically, f12 and CT1 may further satisfy: 4.0<f12/CT1<4.5, for example, 4.01≤f12/CT1≤4.36. By reasonably configuring the ratio between the combined focal length of the first lens and the second lens and the center thickness of the first lens, the optical system may meet the telephoto characteristics and have a good ability to compensate aberrations; at the same time, the deflection angle of the chief ray may also be reasonably controlled, which is beneficial to adjust the structure of the optical system.

In an exemplary embodiment, the optical imaging lens assembly according to the present disclosure may satisfy: 1.5<T56/T34<2.5, where T56 is a spaced interval between the fifth lens and the sixth lens along the optical axis and T34 is a spaced interval between the third lens and the fourth lens along the optical axis. More specifically, T56 and T34 may further satisfy: 1.55≤T56/T34≤2.23. Reasonably controlling the ratio between the spaced interval of the fifth lens and the sixth lens along the optical axis and the spaced interval of the third lens and the fourth lens along the optical axis may provide sufficient separation space between the lenses, so that the lens surface has a higher degree of freedom of change, thereby improving the system's ability to correct astigmatic and field curvature.

In an exemplary embodiment, the optical imaging lens assembly according to the present disclosure may satisfy: −1.8<R6/R11<−0.8, where R6 is a radius of curvature of an image-side surface of the third lens and R11 is a radius of curvature of the object-side surface of the sixth lens. More specifically, R6 and R11 may further satisfy: −1.69≤R6/R11≤−0.90. By reasonably configuring the radius of curvature of the third lens image-side surface and the sixth lens object-side surface (further, for example, ensuring the image-side surface of the third lens is concave while satisfying that the object-side surface of the sixth lens is concave), the light deflection angle may be adjusted, so that the optical system may better match the chief ray angle of the chip.

In an exemplary embodiment, the optical imaging lens assembly described above may further include at least one stop to improve the imaging quality of the lens assembly. Optionally, the stop may be disposed between the object side and the first lens.

Optionally, the above optical imaging lens assembly may further include an optical filter for correcting the color deviation and/or a protective glass for protecting the photosensitive element on the imaging plane.

The optical imaging lens assembly according to the above embodiments of the present disclosure may employ a plurality of lenses, such as six lenses as described above. By properly configuring the refractive power of each lens, the surface shape, the center thickness of each lens, and spaced intervals on the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. The optical imaging lens assembly configured as described above may also have advantageous effects such as long focal length and high image quality, and the like.

In the embodiments of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 1 shows surface type, radius of curvature, thickness, material and conic coefficient of each lens of the optical imaging lens assembly in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5469 | | | |
| S1 | aspheric | 1.5496 | 0.9420 | 1.55 | 56.1 | 0.0535 |
| S2 | aspheric | −9.7247 | 0.0300 | | | 5.0000 |
| S3 | aspheric | 125.3441 | 0.2300 | 1.67 | 20.4 | 5.0000 |
| S4 | aspheric | 3.5274 | 0.3643 | | | 5.0000 |
| S5 | aspheric | 7.7106 | 0.2484 | 1.55 | 56.1 | −2.5496 |
| S6 | aspheric | 3.5599 | 0.4259 | | | −0.7669 |
| S7 | aspheric | −8.6927 | 0.3355 | 1.65 | 23.5 | 5.0000 |
| S8 | aspheric | −3.7218 | 0.1257 | | | 5.0000 |
| S9 | aspheric | −2.2540 | 0.2300 | 1.55 | 56.1 | 3.2799 |
| S10 | aspheric | −7.4377 | 0.9493 | | | −99.0000 |
| S11 | aspheric | −3.1966 | 0.7621 | 1.55 | 56.1 | −19.2625 |
| S12 | aspheric | −7.1889 | 0.2570 | | | −12.5840 |
| S13 | spherical | infinite | 0.1100 | 1.52 | 64.2 | |
| S14 | spherical | infinite | 0.4000 | | | |
| S15 | spherical | infinite | | | | |

As can be seen from Table 1, the object-side surface and the image-side surface of any one of the first lens E1 to the sixth lens E6 are aspheric. In this example, the surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10 and A12 applicable to each aspheric surface S1-S12 in example 1.

TABLE 2

| Surface number | A4 | A6 | A8 | A10 | A12 |
|---|---|---|---|---|---|
| S1 | −7.1400E−03 | −5.6300E−03 | 8.5500E−04 | −2.0900E−03 | −3.4000E−04 |
| S2 | 4.4009E−02 | −2.4390E−02 | 4.6520E−03 | 7.8540E−03 | −3.9800E−03 |
| S3 | 4.8091E−02 | 2.4530E−03 | −3.8060E−02 | 5.5701E−02 | −2.5820E−02 |
| S4 | 3.3611E−02 | 6.9284E−02 | −1.6039E−01 | 2.5321E−01 | −1.5056E−01 |
| S5 | 9.3483E−02 | 2.6805E−02 | 1.4567E−02 | 5.0120E−02 | 7.6680E−03 |
| S6 | 4.3082E−02 | 2.6508E−02 | −9.8690E−02 | 1.6095E−01 | −5.1000E−11 |
| S7 | −1.8306E−01 | −1.4385E−01 | −1.3446E−01 | −5.3200E−02 | 1.4800E−09 |
| S8 | −1.3237E−01 | −8.0280E−02 | 2.0739E−02 | −3.4920E−02 | 4.3565E−02 |
| S9 | 5.9025E−02 | 1.8840E−02 | −7.2500E−03 | 7.2300E−04 | −2.1000E−05 |
| S10 | 4.9976E−02 | 4.5438E−02 | −8.5500E−02 | 4.0896E−02 | −7.1800E−03 |
| S11 | −8.0210E−02 | 3.7500E−02 | −5.9400E−03 | 2.6800E−04 | 1.7800E−05 |
| S12 | −4.6260E−02 | −4.8500E−03 | 6.5060E−03 | −2.0100E−03 | 2.1400E−04 |

Table 3 shows effective focal lengths f1 to f6 of respective lens, a total effective focal length f of the optical imaging lens assembly, a total track length TTL (a distance along the optical axis from the object-side surface S1 of the first lens E1 to the imaging plane S15) and half of a maximal field-of-view HFOV in example 1.

TABLE 3

| f1 (mm) | 2.52 | f6 (mm) | −11.29 |
|---|---|---|---|
| f2 (mm) | −5.44 | f (mm) | 6.01 |
| f3 (mm) | −12.36 | TTL (mm) | 5.41 |
| f4 (mm) | 9.81 | HFOV (°) | 24.2 |
| f5 (mm) | −6.01 | | |

The optical imaging lens assembly in example 1 satisfies the followings:

TTL/f=0.90, where TTL is the distance along the optical axis from the object-side surface S1 of the first lens E1 to the imaging plane 515, and f is the total effective focal length of the optical imaging lens assembly;

f3/f=−2.06, where f3 is the effective focal length of the third lens E3, and f is the total effective focal length of the optical imaging lens assembly;

f3/f1=−4.91, where f3 is the effective focal length of the third lens E3, and f1 is the effective focal length of the first lens E1;

f2/R4=−1.54, where f2 is the effective focal length of the second lens E2, and R4 is a radius of curvature of the image-side surface S4 of the second lens E2;

f/f5=−1.00, where f is the total effective focal length of the optical imaging lens assembly and f5 is the effective focal length of the fifth lens E5;

f1/R1=1.63, where f1 is the effective focal length of the first lens E1, and R1 is a radius of curvature of the object-side surface S1 of the first lens E1;

R8/R2=0.38, where R8 is a radius of curvature of the image-side surface S8 of the fourth lens E4, and R2 is a radius of curvature of the image-side surface S2 of the first lens E1;

R9/R12=0.31, where R9 is a radius of curvature of the object-side surface S9 of the fifth lens E5, and R12 is a radius of curvature of the image-side surface S12 of the sixth lens E6;

tan(HFOV)=0.45, where HFOV is half of a maximal field-of-view of the optical imaging lens assembly;

CT6/CT4=2.27, where CT6 is a center thickness of the sixth lens E6 along the optical axis, and CT4 is a center thickness of the fourth lens E4 along the optical axis;

ET5/CT5=2.13, where ET5 is an edge thickness at a maximum effective radius of the fifth lens, and CT5 is a center thickness of the fifth lens along the optical axis;

f12/CT1=4.01, where f12 is a combined focal length of the first lens E1 and the second lens E2, and CT1 is a center thickness of the first lens E1 along the optical axis;

T56/T34=2.23, where T56 is a spaced interval between the fifth lens E5 and the sixth lens E6 along the optical axis, and T34 is a spaced interval between the third lens E3 and the fourth lens E4 along the optical axis; and R6/R11=−1.11, where R6 is a radius of curvature of the image-side surface S6 of the third lens E3 and R11 is a radius of curvature of the object-side surface S11 of the sixth lens E6.

Figure 2A:
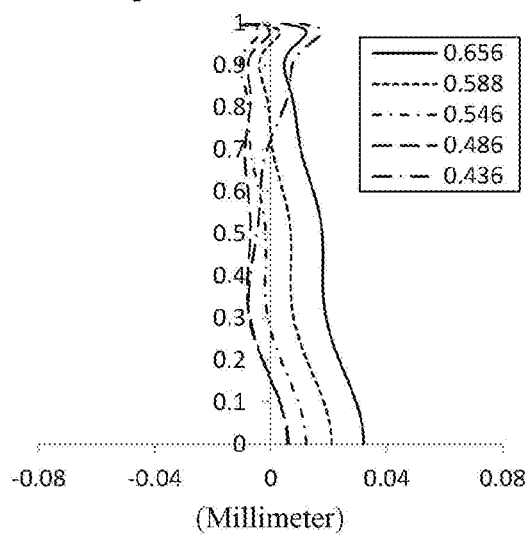
FIG. 2A illustrates a longitudinal aberration curve of the optical imaging lens assembly of the Example 1.
Figure 2B:
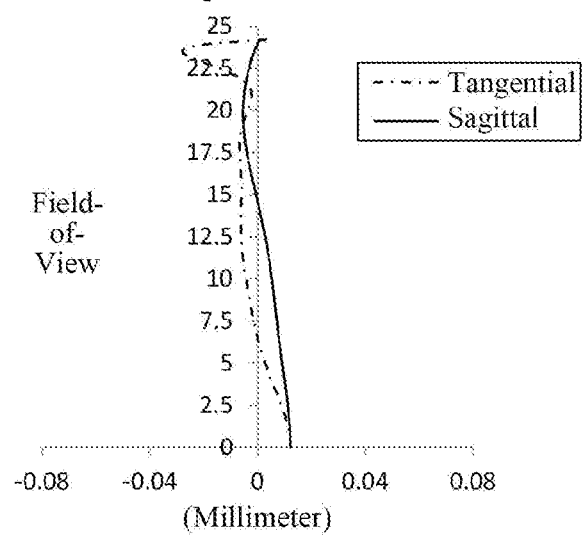
FIG. 2B illustrates an astigmatic curve of the optical imaging lens assembly of the Example 1.
Figure 2C:
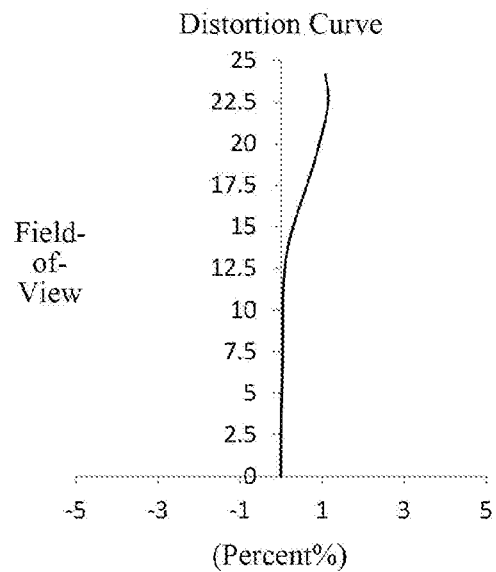
FIG. 2C illustrates a distortion curve of the optical imaging lens assembly of the Example 1.
Figure 2D:
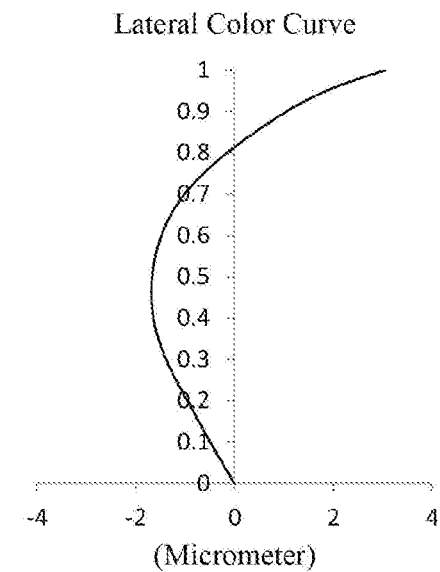
FIG. 2D illustrates a lateral color curve of the optical imaging lens assembly of the Example 1.

FIG. 2A illustrates a longitudinal aberration curve of the optical imaging lens assembly according to example 1, representing deviations of focal points converged by light of different wavelengths after passing through the optical imaging lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion at different image heights. FIG. 2D illustrates a lateral color curve of the optical imaging lens assembly according to example 1, representing deviations of different image heights on an imaging plane after light passes through the optical imaging lens assembly. It can be seen from FIG. 2A to FIG. 2D that the optical imaging lens assembly provided in example 1 may achieve good image quality.

Example 2

Figure 3:
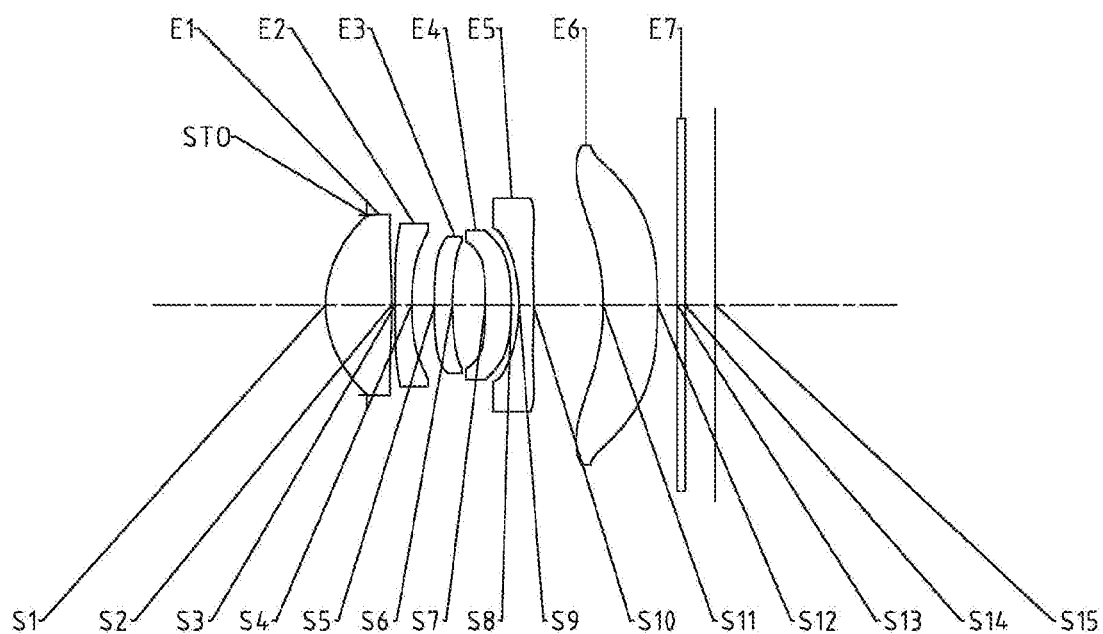
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 4 shows surface type, radius of curvature, thickness, material and conic coefficient of each lens of the optical imaging lens assembly in example 2, wherein the units for the radius of curvature and the thickness are millimeter (mm).

TABLE 4

| Surface number | Surface type | Radius of curvature | Thickness | Refractive index | Abbe number | Conic coefficient |
|---|---|---|---|---|---|---|
| OBJ | spherical | infinite | infinite | | | |
| STO | spherical | infinite | −0.5726 | | | |
| S1 | aspheric | 1.5521 | 0.9171 | 1.55 | 56.1 | 0.0509 |
| S2 | aspheric | −9.2046 | 0.0500 | | | 1.5572 |
| S3 | aspheric | 92.8171 | 0.2287 | 1.67 | 20.4 | 99.0000 |
| S4 | aspheric | 3.4734 | 0.3192 | | | 5.1560 |
| S5 | aspheric | 11.3211 | 0.2456 | 1.55 | 56.1 | 4.3860 |
| S6 | aspheric | 4.3856 | 0.4576 | | | −3.2414 |
| S7 | aspheric | −11.4784 | 0.3608 | 1.65 | 23.5 | −75.2453 |
| S8 | aspheric | −4.4038 | 0.1092 | | | 8.1685 |
| S9 | aspheric | −2.2473 | 0.2000 | 1.55 | 56.1 | 3.2630 |
| S10 | aspheric | −7.9696 | 0.9666 | | | −93.3431 |
| S11 | aspheric | −3.5901 | 0.7552 | 1.55 | 56.1 | −21.6676 |
| S12 | aspheric | −7.7945 | 0.2735 | | | −12.1386 |
| S13 | spherical | infinite | 0.1100 | 1.52 | 64.2 | |

TABLE 4-continued

| Surface number | Surface type | Radius of curvature | Thickness | Material Refractive index | Abbe number | Conic coefficient |
|---|---|---|---|---|---|---|
| S14 | spherical | infinite | 0.4165 | | | |
| S15 | spherical | infinite | | | | |

As can be seen from Table 4, in example 2, the object-side surface and the image-side surface of any one of the first lens E1 to the sixth lens E6 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 |
|---|---|---|---|---|---|
| S1 | −9.1900E−03 | 4.5550E−03 | −4.2900E−02 | 1.0885E−01 | −1.8016E−01 |
| S2 | 4.8469E−02 | −6.7460E−02 | 8.4566E−02 | 1.3737E−01 | −6.6071E−01 |
| S3 | 5.3242E−04 | −4.7640E−02 | −2.8000E−04 | 6.2066E−01 | −1.9816E+00 |
| S4 | 2.9198E−02 | 1.1306E−01 | −7.3877E−01 | 3.5116E+00 | −9.3700E+00 |
| S5 | 9.2101E−02 | −7.4230E−02 | 9.4100E−01 | −4.0718E+00 | 1.1694E+01 |
| S6 | 4.4875E−02 | −1.5691E−01 | 1.4580E+00 | −7.6674E+00 | 2.5977E+01 |
| S7 | −1.6322E−01 | −4.1522E−01 | 1.8788E+00 | −8.9533E+00 | 2.6315E+01 |
| S8 | −1.1062E−01 | −3.2477E−01 | 1.3244E+00 | −4.5917E+00 | 1.0255E+01 |
| S9 | 5.7390E−02 | −1.3901E−01 | 7.0088E−01 | −2.2748E+00 | 4.7617E+00 |
| S10 | 5.2428E−02 | 3.3294E−02 | −6.5760E−02 | 4.9124E−02 | −4.9590E−02 |
| S11 | −7.8480E−02 | 3.5531E−02 | −5.2000E−03 | −9.7000E−06 | 1.6600E−04 |
| S12 | −4.7070E−02 | −3.4900E−03 | 5.9180E−03 | −1.7600E−03 | 1.0200E−04 |

| Surface number | A14 | A16 | A18 | A20 |
|---|---|---|---|---|
| S1 | 1.8490E−01 | −1.1529E−01 | 3.9512E−02 | −5.6800E−03 |
| S2 | 1.0128E+00 | −8.0084E−01 | 3.3167E−01 | −5.7260E−02 |
| S3 | 2.9363E+00 | −2.3869E+00 | 1.0403E+00 | −1.9229E−01 |
| S4 | 1.4816E+01 | −1.4024E+01 | 7.3973E+00 | −1.6871E+00 |
| S5 | −2.1313E+01 | 2.3720E+01 | −1.4623E+01 | 3.8514E+00 |
| S6 | −5.5209E+01 | 7.1191E+01 | −5.0833E+01 | 1.5510E+01 |
| S7 | −5.0536E+01 | 6.0769E+01 | −1.2190E+01 | 1.3002E+01 |
| S8 | −1.4096E+01 | 1.1601E+01 | −5.2997E+00 | 1.0527E+00 |
| S9 | −5.9745E+00 | 4.3081E+00 | −1.6439E+00 | 2.5712E−01 |
| S10 | 4.3830E−02 | −2.2290E−02 | 5.7950E−03 | −6.1000E−04 |
| S11 | −5.7000E−05 | 1.2300E−05 | −1.5000E−06 | 7.5200E−08 |
| S12 | 4.7600E−05 | −1.4000E−05 | 2.0900E−06 | −1.2000E−07 |

Table 6 shows effective focal lengths f1 to f6 of respective lens, a total effective focal length f of the optical imaging lens assembly, a total track length TTL and half of a maximal field-of-view HFOV in example 2.

TABLE 6

| f1 (mm) | 2.51 | f6 (mm) | −13.00 |
|---|---|---|---|
| f2 (mm) | −5.41 | f (mm) | 5.99 |
| f3 (mm) | −13.27 | TTL (mm) | 5.41 |
| f4 (mm) | 10.86 | HFOV (°) | 24.2 |
| f5 (mm) | −5.80 | | |

Figure 4A:
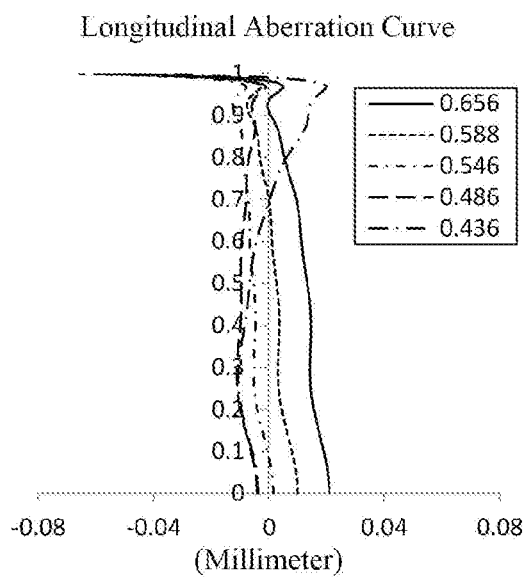
FIG. 4A illustrates a longitudinal aberration curve of the optical imaging lens assembly of the Example 2.
Figure 4B:
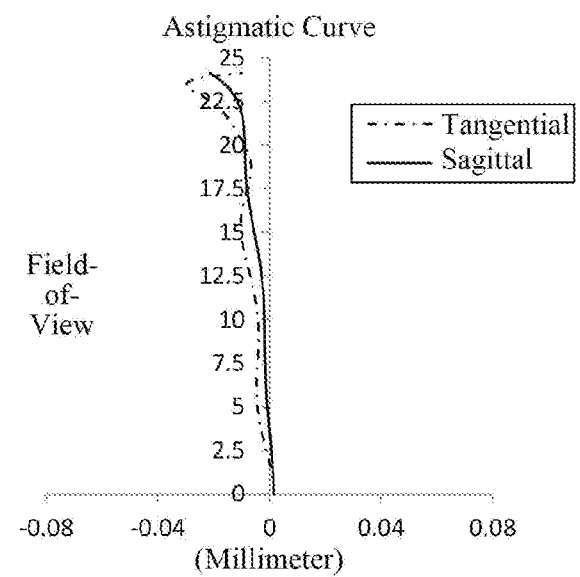
FIG. 4B illustrates an astigmatic curve of the optical imaging lens assembly of the Example 2.
Figure 4C:
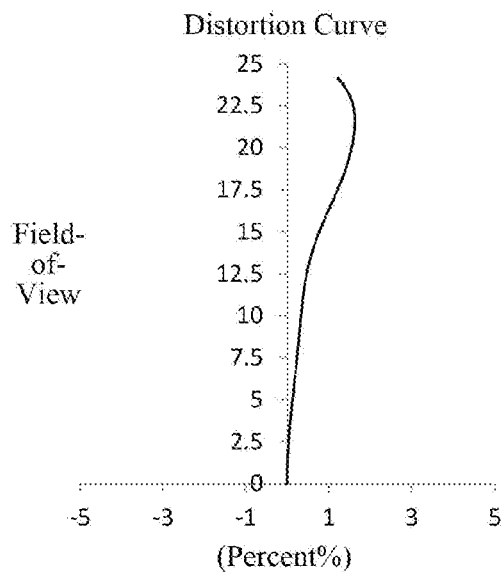
FIG. 4C illustrates a distortion curve of the optical imaging lens assembly of the Example 2.
Figure 4D:
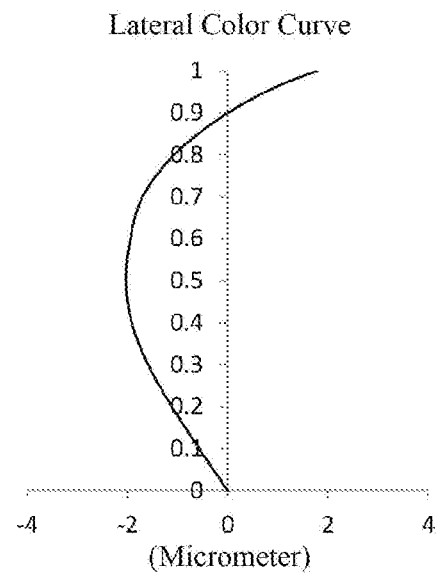
FIG. 4D illustrates a lateral color curve of the optical imaging lens assembly of the Example 2.

FIG. 4A illustrates a longitudinal aberration curve of the optical imaging lens assembly according to example 2, representing deviations of focal points converged by light of different wavelengths after passing through the optical imaging lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion at different image heights. FIG. 4D illustrates a lateral color curve of the optical imaging lens assembly according to example 2, representing deviations of different image heights on an imaging plane after light passes through the optical imaging lens assembly. It can be seen from FIG. 4A to FIG. 4D that the optical imaging lens assembly provided in example 2 may achieve good image quality.

Example 3

Figure 5:
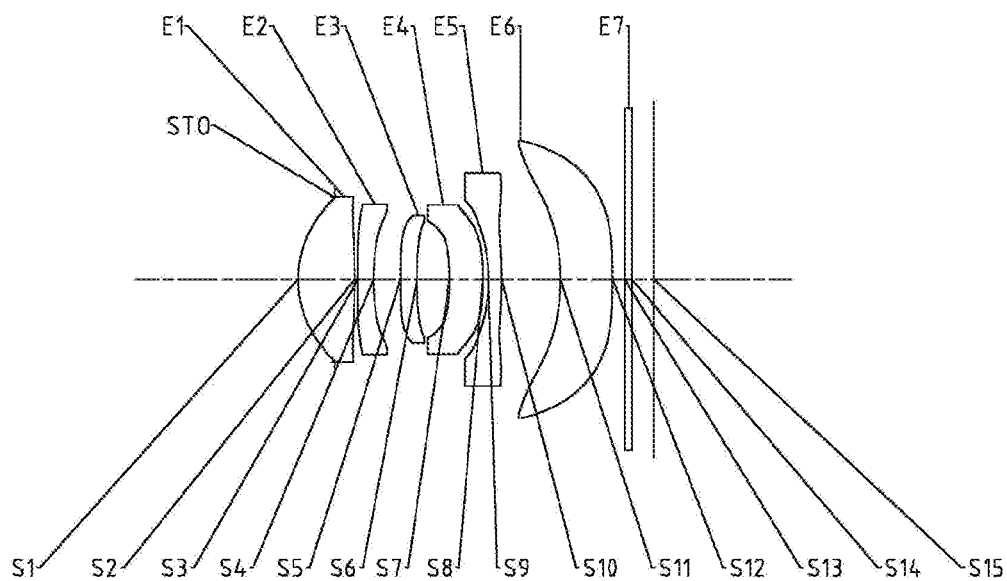
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 7 shows surface type, radius of curvature, thickness, material and conic coefficient of each lens of the optical imaging lens assembly in example 3, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5581 | | | |
| S1 | aspheric | 1.5791 | 0.8610 | 1.55 | 56.1 | 0.0564 |
| S2 | aspheric | −8.8843 | 0.0500 | | | 1.6167 |
| S3 | aspheric | −283.8950 | 0.2392 | 1.67 | 20.4 | −99.0000 |
| S4 | aspheric | 4.1435 | 0.4086 | | | 6.0361 |
| S5 | aspheric | 20.9973 | 0.2506 | 1.55 | 56.1 | 99.0000 |
| S6 | aspheric | 6.1315 | 0.4946 | | | 3.6480 |
| S7 | aspheric | −5.3482 | 0.5082 | 1.65 | 23.5 | −16.0656 |
| S8 | aspheric | −5.5663 | 0.0863 | | | 0.0060 |
| S9 | aspheric | −2.7484 | 0.2000 | 1.55 | 56.1 | 3.5589 |
| S10 | aspheric | −5.8179 | 0.8946 | | | −34.4829 |
| S11 | aspheric | −3.6252 | 0.7934 | 1.55 | 56.1 | −6.0287 |
| S12 | aspheric | −17.5110 | 0.1853 | | | 67.3110 |
| S13 | spherical | infinite | 0.1100 | 1.52 | 64.2 | |
| S14 | spherical | infinite | 0.3295 | | | |
| S15 | spherical | infinite | | | | |

As can be seen from Table 7, in example 3, the object-side surface and the image-side surface of any one of the first lens E1 to the sixth lens E6 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 |
|---|---|---|---|---|---|
| S1 | −7.8900E−03 | −9.3900E−03 | 2.2714E−02 | −8.0740E−02 | 1.5731E−01 |
| S2 | 4.0850E−02 | −5.2260E−02 | 2.2297E−01 | −5.5308E−01 | 7.5609E−01 |
| S3 | 4.0257E−02 | −1.8600E−03 | 1.6968E−01 | −4.5423E−01 | 4.2654E−01 |
| S4 | 1.7871E−02 | 1.2372E−01 | −3.9922E−01 | 1.6645E+00 | −4.6298E+00 |
| S5 | 8.0248E−02 | −2.4080E−02 | 1.0651E+00 | −5.0884E+00 | 1.4299E+01 |
| S6 | 2.6427E−02 | −1.2950E−02 | 4.3982E−01 | −1.5877E+00 | 2.8924E+00 |
| S7 | −1.9911E−01 | −3.3891E−01 | 1.4257E+00 | −5.9431E+00 | 1.4200E+01 |
| S8 | −1.6327E−01 | −6.6520E−02 | −3.3278E−01 | 1.1004E+00 | −4.0662E−01 |
| S9 | 1.0836E−02 | −7.8120E−02 | −6.1719E−01 | 3.0383E+00 | −5.0823E+00 |
| S10 | 5.7407E−02 | −1.3480E−01 | 4.1236E−01 | −6.0217E−01 | 5.0046E−01 |
| S11 | −6.1730E−02 | 3.5997E−02 | −2.4080E−02 | 1.0972E−02 | −3.0700E−03 |
| S12 | −9.8690E−02 | 5.4252E−02 | −3.3050E−02 | 1.4718E−02 | −4.6900E−03 |

| Surface number | A14 | A16 | A18 | A20 |
|---|---|---|---|---|
| S1 | −1.8540E−01 | 1.2786E−01 | −4.8050E−02 | 7.6880E−03 |
| S2 | −6.2332E−01 | 3.2248E−01 | −1.0028E−01 | 1.4875E−02 |
| S3 | −3.5810E−02 | −2.0727E−01 | 1.3563E−01 | −2.6930E−02 |
| S4 | 7.5827E+00 | −7.1526E+00 | 3.5979E+00 | −7.5197E−01 |
| S5 | −2.4911E+01 | 2.6657E+01 | −1.5982E+01 | 4.1252E+00 |
| S6 | −2.4251E+00 | 2.0637E−02 | 1.5711E+00 | −8.1328E−01 |
| S7 | −2.1758E+01 | 1.9862E+01 | −9.9666E+00 | 2.2340E+00 |
| S8 | −2.1895E+00 | 3.5682E+00 | −2.2026E+00 | 5.0635E−01 |

TABLE 8-continued

| | | | | |
|---|---|---|---|---|
| S9 | 4.0846E+00 | −1.4796E+00 | 7.7786E−02 | 5.8527E−02 |
| S10 | −2.5642E−01 | 8.0323E−02 | −1.4100E−02 | 1.0600E−03 |
| S11 | 8.4200E−04 | −2.4000E−04 | 3.9800E−05 | −2.7000E−06 |
| S12 | 9.5100E−04 | −1.0000E−04 | 2.4800E−06 | 2.9300E−07 |

Table 9 shows effective focal lengths f1 to f6 of respective lens, a total effective focal length f of the optical imaging lens assembly, a total track length TTL and half of a maximal field-of-view HFOV in example 3.

TABLE 9

| | | | |
|---|---|---|---|
| f1 (mm) | 2.53 | f6 (mm) | −8.54 |
| f2 (mm) | −6.12 | f (mm) | 5.99 |
| f3 (mm) | −15.94 | TTL (mm) | 5.41 |
| f4 (mm) | −2457.82 | HFOV (°) | 24.0 |
| f5 (mm) | −9.76 | | |

Figures 6A, 6B:
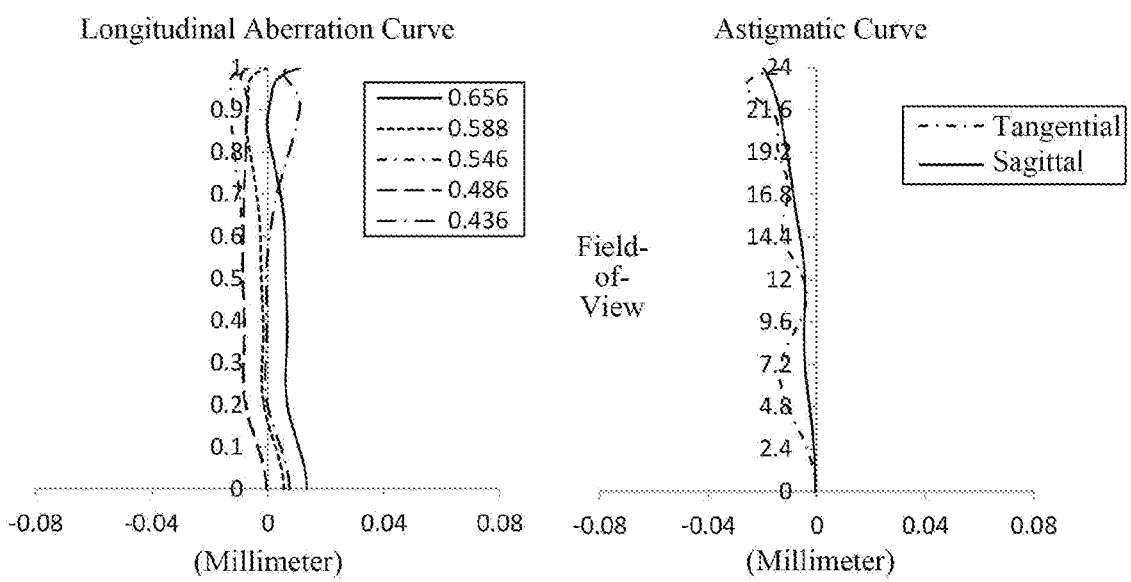
FIG. 6A illustrates a longitudinal aberration curve of the optical imaging lens assembly of the Example 3.
FIG. 6B illustrates an astigmatic curve of the optical imaging lens assembly of the Example 3.

FIG. 6A illustrates a longitudinal aberration curve of the optical imaging lens assembly according to example 3, representing deviations of focal points converged by light of different wavelengths after passing through the optical imaging lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion at different image heights. FIG. 6D illustrates a lateral color curve of the optical imaging lens assembly according to example 3, representing deviations of different image heights on an imaging plane after light passes through the optical imaging lens assembly. It can be seen from FIG. 6A to FIG. 6D that the optical imaging lens assembly provided in example 3 may achieve good image quality.

Example 4

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 10 shows surface type, radius of curvature, thickness, material and conic coefficient of each lens of the optical imaging lens assembly in example 4, wherein the units for the radius of curvature and the thickness are millimeter (mm).

TABLE 10

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| STO | spherical | infinite | −0.5620 | | | |
| S1 | aspheric | 1.5847 | 0.8908 | 1.55 | 56.1 | 0.0629 |
| S2 | aspheric | −8.1910 | 0.0570 | | | −0.9358 |
| S3 | aspheric | 25.1988 | 0.2418 | 1.67 | 20.4 | 99.0000 |
| S4 | aspheric | 3.1558 | 0.4564 | | | 5.5473 |
| S5 | aspheric | 30.6418 | 0.2400 | 1.55 | 56.1 | −21.7054 |
| S6 | aspheric | 4.9828 | 0.5315 | | | −10.6681 |
| S7 | aspheric | −9.2370 | 0.4105 | 1.65 | 23.5 | 81.4030 |
| S8 | aspheric | −3.7595 | 0.0832 | | | 7.3825 |
| S9 | aspheric | −2.3068 | 0.2336 | 1.55 | 56.1 | 3.1288 |
| S10 | aspheric | −43.2184 | 0.8260 | | | 99.0000 |
| S11 | aspheric | −5.5591 | 0.8369 | 1.55 | 56.1 | −76.6456 |
| S12 | aspheric | −5.7384 | 0.2735 | | | −58.7405 |
| S13 | spherical | infinite | 0.1100 | 1.52 | 64.2 | |
| S14 | spherical | infinite | 0.4165 | | | |
| S15 | spherical | infinite | | | | |

As can be seen from Table 10, in example 4, the object-side surface and the image-side surface of any one of the first lens E1 to the sixth lens E6 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 |
|---|---|---|---|---|---|
| S1 | −8.2600E−03 | −7.2300E−03 | 1.8650E−02 | −7.1540E−02 | 1.3834E−01 |
| S2 | 3.8506E−02 | −1.9760E−02 | 4.2270E−02 | −1.0074E−01 | 1.5118E−01 |
| S3 | 3.8733E−02 | 2.4105E−02 | −1.8250E−02 | 4.6095E−02 | −1.8342E−01 |
| S4 | 2.1464E−02 | 7.1804E−02 | −1.2249E−01 | 5.5432E−01 | −1.5938E+00 |
| S5 | 7.0721E−02 | 4.1158E−02 | 5.0016E−01 | −2.5150E+00 | 7.4701E+00 |
| S6 | 6.3050E−03 | 9.4084E−02 | −3.5465E−01 | 1.9084E+00 | −6.4284E+00 |
| S7 | −2.0482E−01 | −2.4814E−01 | 9.4713E−01 | −5.3329E+00 | 1.6104E+01 |
| S8 | −1.4742E−01 | −9.1590E−02 | 4.8681E−01 | −1.8368E+00 | 4.3864E+00 |
| S9 | −7.6300E−03 | 5.4016E−02 | 2.0964E−01 | −7.4217E−01 | 1.4996E+00 |
| S10 | 2.9443E−02 | 3.0790E−03 | 3.3628E−02 | −1.1276E−01 | 1.2086E−01 |
| S11 | −4.4870E−02 | 1.6698E−02 | −4.2400E−03 | 1.8390E−03 | −5.7000E−04 |
| S12 | −4.2040E−02 | −4.7600E−03 | 4.1460E−03 | −1.2900E−03 | 5.3200E−05 |

| Surface number | A14 | A16 | A18 | A20 |
|---|---|---|---|---|
| S1 | −1.5986E−01 | 1.0853E−01 | −1.0270E−02 | 6.3580E−03 |
| S2 | −1.4841E−01 | 9.8168E−02 | −3.9660E−02 | 7.4400E−03 |
| S3 | 3.1543E−01 | −2.7580E−01 | 1.2181E−01 | −2.1390E−02 |
| S4 | 2.6295E+00 | −2.4974E+00 | 1.2361E+00 | −2.4367E−01 |
| S5 | −1.3451E+01 | 1.4596E+01 | −8.7722E+00 | 2.2617E+00 |
| S6 | 1.3364E+01 | −1.6528E+01 | 1.1211E+01 | −3.1960E+00 |
| S7 | −2.9998E+01 | 3.3258E+01 | −2.0584E+01 | 5.5986E+00 |
| S8 | −6.6431E+00 | 6.0187E+00 | −2.9582E+00 | 6.1108E−01 |
| S9 | −2.2486E+00 | 2.1350E+00 | −1.0883E+00 | 2.2507E−01 |
| S10 | −6.8210E−02 | 2.1891E−02 | −3.7800E−03 | 2.7300E−04 |
| S11 | 7.3600E−05 | 1.0600E−06 | −1.1000E−06 | 7.1700E−08 |
| S12 | 7.9100E−05 | −2.6000E−05 | 3.8800E−06 | −2.2000E−07 |

Table 12 shows effective focal lengths f1 to f6 of respective lens, a total effective focal length f of the optical imaging lens assembly, a total track length TTL and half of a maximal field-of-view HFOV in example 4.

TABLE 12

| f1 (mm) | 2.51 | f6 (mm) | 500.98 |
|---|---|---|---|
| f2 (mm) | −5.43 | f (mm) | 6.17 |
| f3 (mm) | −10.92 | TTL (mm) | 5.61 |
| f4 (mm) | 9.55 | HFOV (°) | 23.3 |
| f5 (mm) | −4.47 | | |

Figures 8A, 8B:
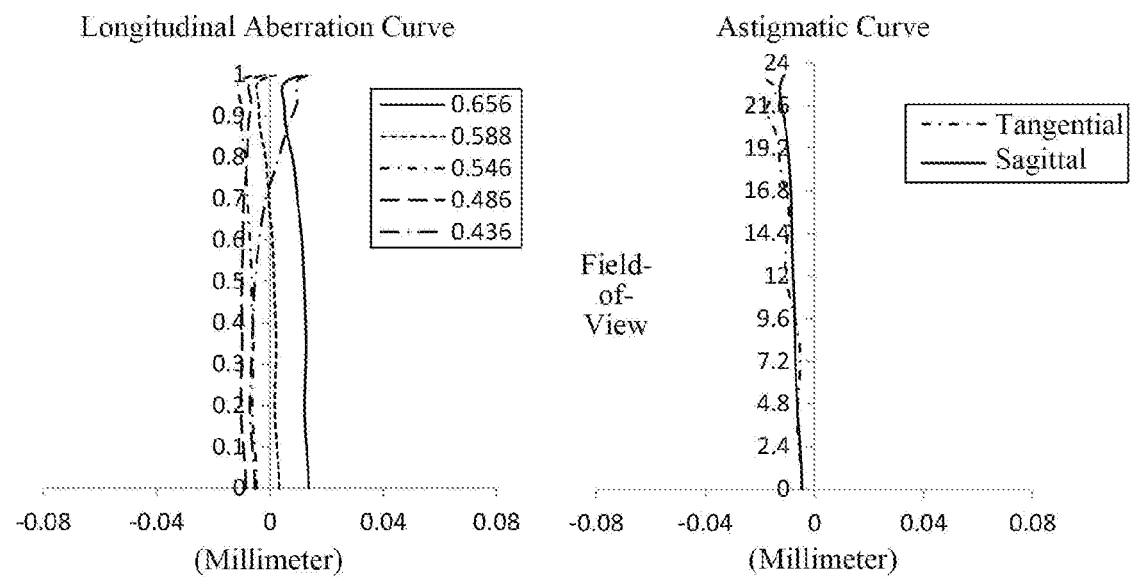
FIG. 8A illustrates a longitudinal aberration curve of the optical imaging lens assembly of the Example 4.
FIG. 8B illustrates an astigmatic curve of the optical imaging lens assembly of the Example 4.
Figures 8C, 8D:
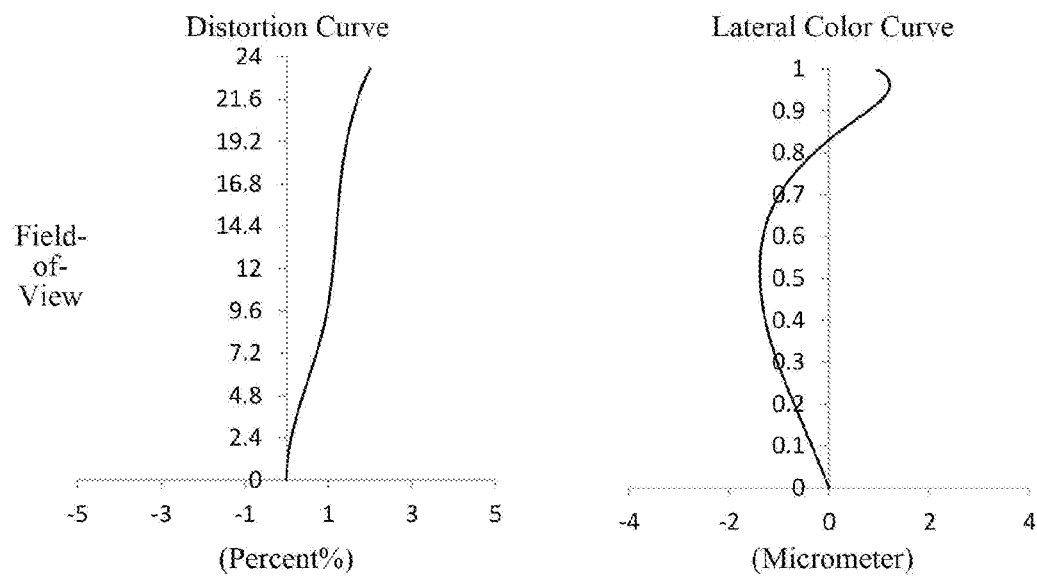
FIG. 8C illustrates a distortion curve of the optical imaging lens assembly of the Example 4.
FIG. 8D illustrates a lateral color curve of the optical imaging lens assembly of the Example 4.

FIG. 8A illustrates a longitudinal aberration curve of the optical imaging lens assembly according to example 4, representing deviations of focal points converged by light of different wavelengths after passing through the optical imaging lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion at different image heights. FIG. 8D illustrates a lateral color curve of the optical imaging lens assembly according to example 4, representing deviations of different image heights on an imaging plane after light passes through the optical imaging lens assembly. It can be seen from FIG. 8A to FIG. 8D that the optical imaging lens assembly provided in example 4 may achieve good image quality.

Example 5

Figure 9:
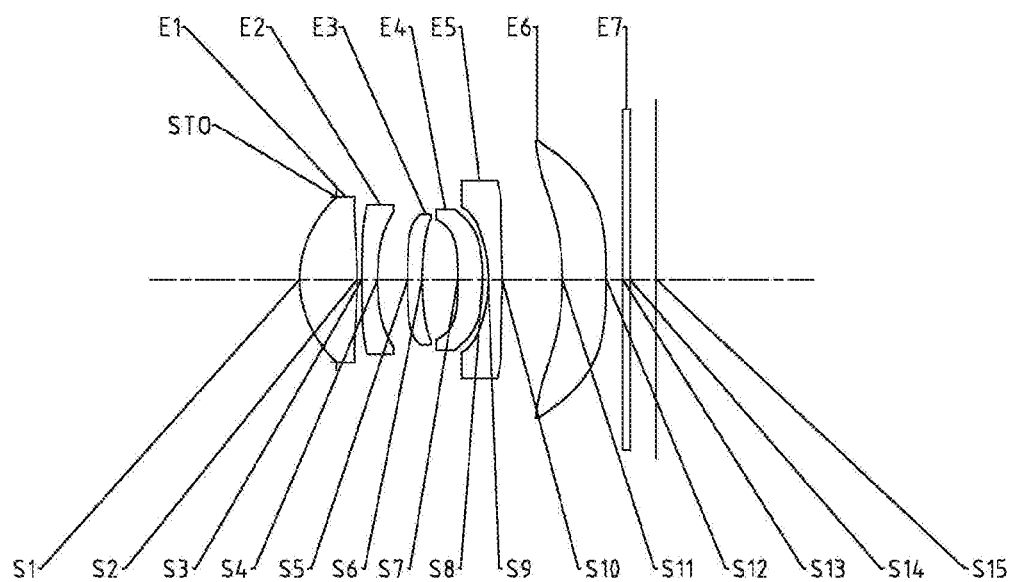
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 13 shows surface type, radius of curvature, thickness, material and conic coefficient of each lens of the optical imaging lens assembly in example 5, wherein the units for the radius of curvature and the thickness are millimeter (mm).

Table 15 shows effective focal lengths f1 to f6 of respective lens, a total effective focal length f of the optical imaging lens assembly, a total track length TTL and half of a maximal field-of-view HFOV in example 5.

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5524 | | | |
| S1 | aspheric | 1.6028 | 0.8726 | 1.55 | 56.1 | 0.0665 |
| S2 | aspheric | −7.0738 | 0.0747 | | | −0.5679 |
| S3 | aspheric | −1233.0700 | 0.2365 | 1.67 | 20.4 | −99.0000 |
| S4 | aspheric | 3.5460 | 0.4578 | | | 5.9695 |
| S5 | aspheric | 40.0919 | 0.2204 | 1.55 | 56.1 | −99.0000 |
| S6 | aspheric | 5.0276 | 0.5367 | | | −7.4593 |
| S7 | aspheric | −10.5862 | 0.3785 | 1.65 | 23.5 | −3.1541 |
| S8 | aspheric | −3.9214 | 0.0862 | | | 9.0783 |
| S9 | aspheric | −2.2872 | 0.2125 | 1.55 | 56.1 | 3.1770 |
| S10 | aspheric | −9.9072 | 0.9107 | | | 9.0005 |
| S11 | aspheric | −4.9410 | 0.6662 | 1.55 | 56.1 | −30.6385 |
| S12 | aspheric | −13.0148 | 0.2521 | | | 20.0714 |
| S13 | spherical | infinite | 0.1100 | 1.52 | 64.2 | |
| S14 | spherical | infinite | 0.3951 | | | |
| S15 | spherical | infinite | | | | |

As can be seen from Table 13, in example 5, the object-side surface and the image-side surface of any one of the first lens E1 to the sixth lens E6 are aspheric. Table 14 shows high-order coefficients applicable to each aspheric surface in example 5, wherein the surface shape of each aspheric surface may be defined by the formula (1) given in the above example 1.

TABLE 15

| f1 (mm) | 2.48 | f6 (mm) | −15.01 |
|---|---|---|---|
| f2 (mm) | −5.30 | f (mm) | 5.99 |
| f3 (mm) | −10.54 | TTL (mm) | 5.41 |

TABLE 14

| Surface number | A4 | A6 | A8 | A10 | A12 |
|---|---|---|---|---|---|
| S1 | −7.7900E−03 | −9.2200E−03 | 2.7569E−02 | −9.2550E−02 | 1.6847E−01 |
| S2 | 3.7613E−02 | −1.4360E−02 | 2.9491E−02 | −8.0990E−02 | 1.3471E−01 |
| S3 | 3.6654E−02 | 3.2157E−02 | −1.3240E−02 | −2.6300E−02 | 6.0580E−03 |
| S4 | 1.8967E−02 | 8.3387E−02 | −1.1918E−01 | 4.6046E−01 | −1.2867E+00 |
| S5 | 5.9561E−02 | 7.8644E−02 | 4.3328E−01 | −2.3422E+00 | 6.8071E+00 |
| S6 | −2.0000E−03 | 1.5041E−01 | −4.4877E−01 | 1.9505E+00 | −6.0121E+00 |
| S7 | −1.9994E−01 | −2.6881E−01 | 1.1538E+00 | −5.6951E+00 | 1.6105E+01 |
| S8 | −1.2711E−01 | −2.4530E−01 | 8.1901E−01 | −2.1894E+00 | 5.1341E+00 |
| S9 | 3.2570E−02 | −1.9713E−01 | 6.4248E−01 | −7.3839E−01 | 7.3161E−01 |
| S10 | 4.8358E−02 | −5.4420E−02 | 2.1369E−01 | −4.1180E−01 | 4.0612E−01 |
| S11 | −6.8300E−02 | 2.4627E−02 | −1.6300E−03 | −1.3100E−03 | 8.6000E−04 |
| S12 | −6.3220E−02 | 6.7180E−03 | 7.0800E−04 | −1.7000E−04 | −5.5000E−04 |

| Surface number | A14 | A16 | A18 | A20 |
|---|---|---|---|---|
| S1 | −1.8610E−01 | 1.2211E−01 | −4.4100E−02 | 6.8030E−03 |
| S2 | −1.4459E−01 | 1.0114E−01 | −1.1390E−02 | 7.5540E−03 |
| S3 | 4.8199E−02 | −5.7580E−02 | 2.5704E−02 | −3.8800E−03 |
| S4 | 2.0701E+00 | −1.9084E+00 | 9.1887E−01 | −1.7786E−01 |
| S5 | −1.1902E+01 | 1.2558E+01 | −7.3445E+00 | 1.8419E+00 |
| S6 | 1.1770E+01 | −1.3872E+01 | 9.0426E+00 | −2.4903E+00 |
| S7 | −2.8490E+01 | 3.0071E+01 | −1.7769E+01 | 4.6399E+00 |
| S8 | −8.7158E+00 | 8.8454E+00 | −4.7476E+00 | 1.0457E+00 |
| S9 | −1.6678E+00 | 2.4144E+00 | −1.5550E+00 | 3.6669E−01 |
| S10 | −2.3129E−01 | 7.7085E−02 | −1.3980E−02 | 1.0650E−03 |
| S11 | −3.2000E−04 | 6.6000E−05 | −7.0000E−06 | 3.0200E−07 |
| S12 | 3.5400E−04 | −1.0000E−04 | 1.4100E−05 | −7.9000E−07 |

TABLE 15-continued

| f4 (mm) | 9.45 | HFOV (°) | 24.0 |
|---|---|---|---|
| f5 (mm) | −5.50 | | |

Figures 10A, 10B:
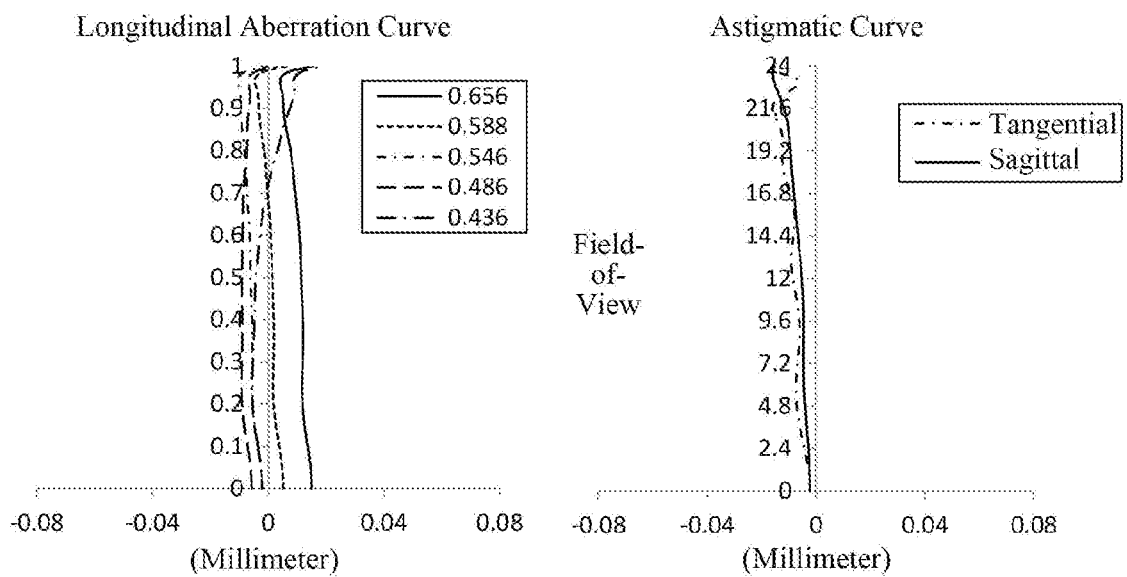
FIG. 10A illustrates a longitudinal aberration curve of the optical imaging lens assembly of the Example 5.
FIG. 10B illustrates an astigmatic curve of the optical imaging lens assembly of the Example 5.
Figures 10C, 10D:
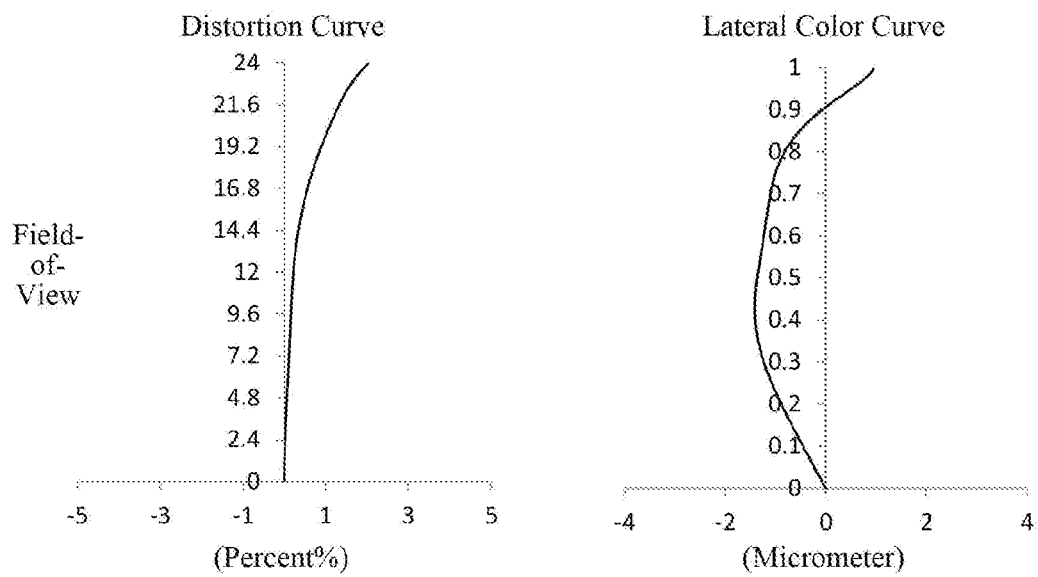
FIG. 10C illustrates a distortion curve of the optical imaging lens assembly of the Example 5.
FIG. 10D illustrates a lateral color curve of the optical imaging lens assembly of the Example 5.

FIG. 10A illustrates a longitudinal aberration curve of the optical imaging lens assembly according to example 5, representing deviations of focal points converged by light of different wavelengths after passing through the optical imaging lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion at different image heights. FIG. 10D illustrates a lateral color curve of the optical imaging lens assembly according to example 5, representing deviations of different image heights on an imaging plane after light passes through the optical imaging lens assembly. It can be seen from FIG. 10A to FIG. 10D that the optical imaging lens assembly provided in example 5 may achieve good image quality.

Example 6

Figure 11:
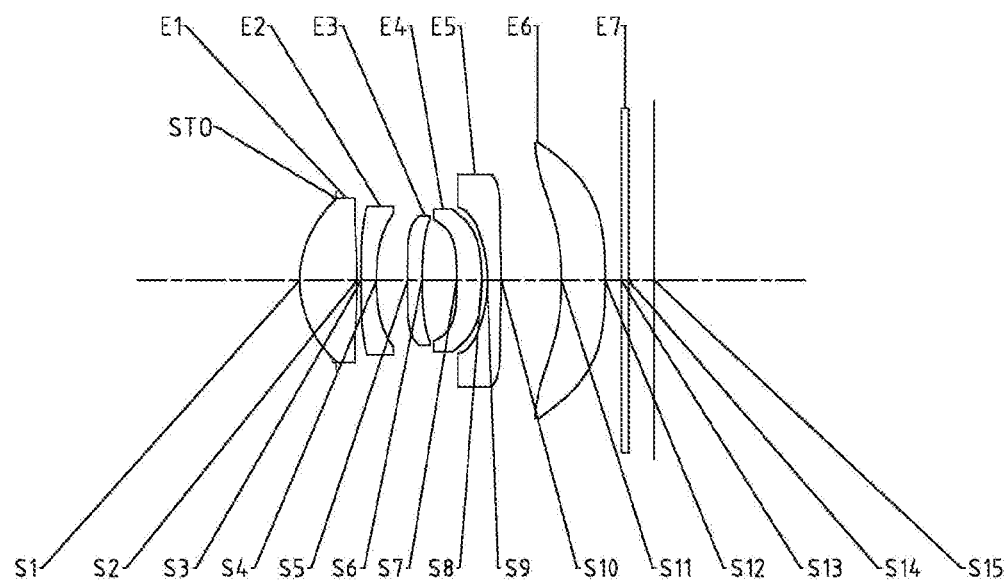
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a concave surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 16 shows surface type, radius of curvature, thickness, material and conic coefficient of each lens of the optical imaging lens assembly in example 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5581 | | | |
| S1 | aspheric | 1.5917 | 0.8769 | 1.55 | 56.1 | 0.0639 |
| S2 | aspheric | −7.5349 | 0.0602 | | | 0.3743 |
| S3 | aspheric | 42.8338 | 0.2347 | 1.67 | 20.4 | 99.0000 |
| S4 | aspheric | 3.2879 | 0.4738 | | | 5.6781 |
| S5 | aspheric | −8233.6400 | 0.2211 | 1.55 | 56.1 | 99.0000 |
| S6 | aspheric | 5.9057 | 0.5265 | | | −11.2589 |
| S7 | aspheric | −10.5677 | 0.3851 | 1.65 | 23.5 | −0.8629 |
| S8 | aspheric | −3.9706 | 0.0859 | | | 9.3647 |
| S9 | aspheric | −2.2971 | 0.2135 | 1.55 | 56.1 | 3.1699 |
| S10 | aspheric | −9.5515 | 0.9187 | | | 1.6385 |
| S11 | aspheric | −4.5310 | 0.6660 | 1.55 | 56.1 | −28.0626 |
| S12 | aspheric | −11.1047 | 0.2473 | | | 13.6441 |
| S13 | spherical | infinite | 0.1100 | 1.52 | 64.2 | |
| S14 | spherical | infinite | 0.3904 | | | |
| S15 | spherical | infinite | | | | |

As shown in FIG. 11, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

As can be seen from Table 16, in example 6, the object-side surface and the image-side surface of any one of the first lens E1 to the sixth lens E6 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 |
|---|---|---|---|---|---|
| S1 | −7.7000E−03 | −9.5800E−03 | 2.8678E−02 | −9.5760E−02 | 1.7397E−01 |
| S2 | 4.0455E−02 | −3.6060E−02 | 1.0279E−01 | −2.3377E−01 | 3.3994E−01 |
| S3 | 4.0155E−02 | −1.5200E−03 | 9.7545E−02 | −2.5378E−01 | 3.1457E−01 |
| S4 | 2.1174E−02 | 5.9349E−02 | −5.0750E−02 | 3.1394E−01 | −1.0549E+00 |
| S5 | 7.1150E−02 | 4.9807E−02 | 4.7940E−01 | −2.4123E+00 | 6.9462E+00 |
| S6 | 5.6880E−03 | 1.2453E−01 | −4.2552E−01 | 2.0016E+00 | −6.2790E+00 |
| S7 | −1.9832E−01 | −2.6411E−01 | 1.0513E+00 | −5.1220E+00 | 1.4210E+01 |
| S8 | −1.2047E−01 | −2.5243E−01 | 6.7951E−01 | −1.4647E+00 | 3.4407E+00 |
| S9 | 4.4408E−02 | −2.3052E−01 | 5.9168E−01 | −2.3376E−01 | −4.8646E−01 |
| S10 | 5.4511E−02 | −7.7280E−02 | 2.7472E−01 | −5.0208E−01 | 4.8414E−01 |
| S11 | −6.9510E−02 | 2.5740E−02 | −1.7800E−03 | −1.3500E−03 | 8.7000E−04 |
| S12 | −5.9610E−02 | 5.3160E−03 | 1.4210E−03 | −3.7000E−04 | −5.3000E−04 |

| Surface number | A14 | A16 | A18 | A20 |
|---|---|---|---|---|
| S1 | −1.9212E−01 | 1.2608E−01 | −4.5560E−02 | 7.0360E−03 |
| S2 | −3.2300E−01 | 1.9861E−01 | −7.1920E−02 | 1.1763E−02 |
| S3 | −2.2352E−01 | 9.1350E−02 | −2.0130E−02 | 2.0860E−03 |
| S4 | 1.8166E+00 | −1.7202E+00 | 8.3235E−01 | −1.6061E−01 |
| S5 | −1.2143E+01 | 1.2838E+01 | −7.5256E+00 | 1.8915E+00 |
| S6 | 1.2319E+01 | −1.4485E+01 | 9.4024E+00 | −2.5714E+00 |
| S7 | −2.4484E+01 | 2.4832E+01 | −1.3940E+01 | 3.4444E+00 |
| S8 | −6.4162E+00 | 6.9511E+00 | −3.8626E+00 | 8.6453E−01 |
| S9 | −1.5660E−01 | 1.3423E+00 | −1.1370E+00 | 2.9682E−01 |
| S10 | −2.7238E−01 | 9.0173E−02 | −1.6310E−02 | 1.2420E−03 |
| S11 | −3.2000E−04 | 6.5200E−05 | −7.0000E−06 | 3.0000E−07 |
| S12 | 3.5800E−04 | −1.0000E−04 | 1.4400E−05 | −8.1000E−07 |

Table 18 shows effective focal lengths f1 to f6 of respective lens, a total effective focal length f of the optical imaging lens assembly, a total track length TTL and half of a maximal field-of-view HFOV in example 6.

TABLE 18

| f1 (mm) | 2.49 | f6 (mm) | −14.53 |
|---|---|---|---|
| f2 (mm) | −5.35 | f (mm) | 5.99 |
| f3 (mm) | −10.80 | TTL (mm) | 5.41 |
| f4 (mm) | 9.64 | HFOV (°) | 24.0 |
| f5 (mm) | −5.59 | | |

Figure 12A:
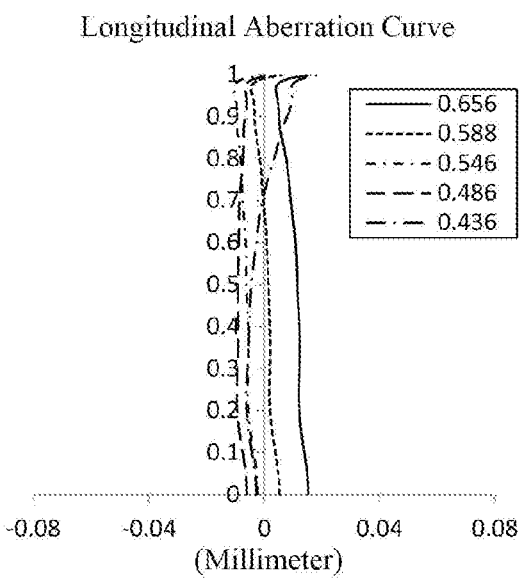
FIG. 12A illustrates a longitudinal aberration curve of the optical imaging lens assembly of the Example 6.
Figure 12B:
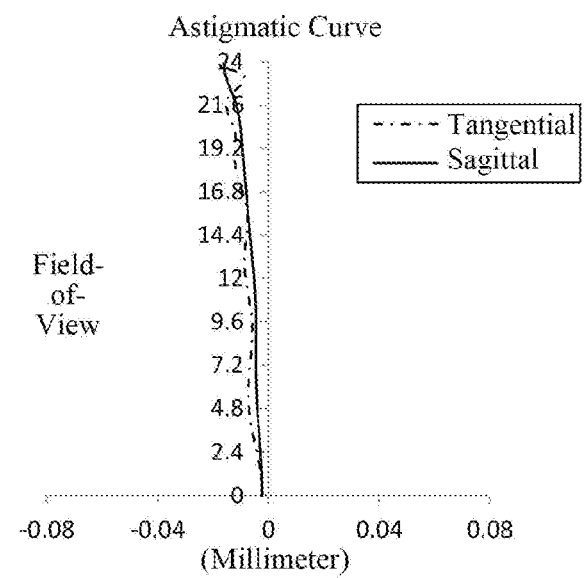
FIG. 12B illustrates an astigmatic curve of the optical imaging lens assembly of the Example 6.
Figure 12C:
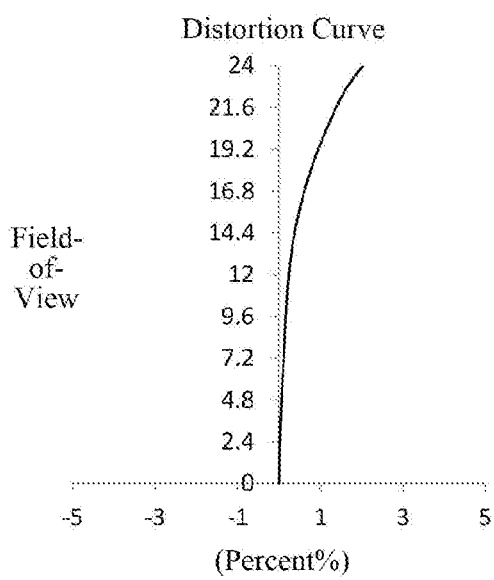
FIG. 12C illustrates a distortion curve of the optical imaging lens assembly of the Example 6.
Figure 12D:
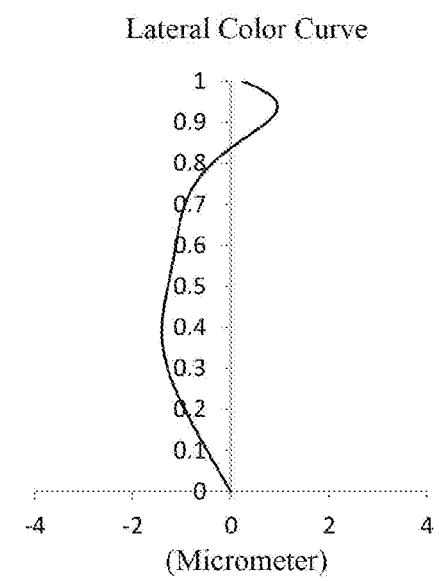
FIG. 12D illustrates a lateral color curve of the optical imaging lens assembly of the Example 6.

FIG. 12A illustrates a longitudinal aberration curve of the optical imaging lens assembly according to example 6, representing deviations of focal points converged by light of different wavelengths after passing through the optical imaging lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion at different image heights. FIG. 12D illustrates a lateral color curve of the optical imaging lens assembly according to example 6, representing deviations of different image heights on an imaging plane after light passes through the optical imaging lens assembly. It can be seen from FIG. 12A to FIG. 12D that the optical imaging lens assembly provided in example 6 may achieve good image quality.

Example 7

Figure 13:
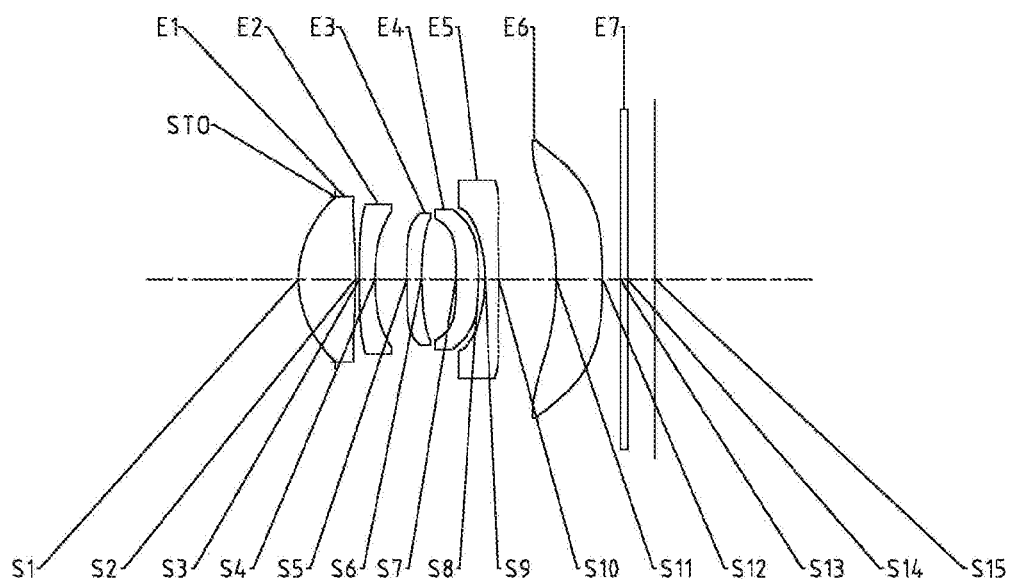
FIG. 13 illustrates a schematic structural view of an optical imaging lens assembly according to Example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 19 shows surface type, radius of curvature, thickness, material and conic coefficient of each lens of the optical imaging lens assembly in example 7, wherein the units for the radius of curvature and the thickness are millimeter (mm).

TABLE 19

| Surface number | Surface type | Radius of curvature | Thickness | Refractive index | Abbe number | Conic coefficient |
|---|---|---|---|---|---|---|
| OBJ | spherical | infinite | infinite | | | |
| STO | spherical | infinite | −0.5528 | | | |
| S1 | aspheric | 1.6012 | 0.8664 | 1.55 | 56.1 | 0.0658 |
| S2 | aspheric | −7.5182 | 0.0596 | | | 0.0891 |
| S3 | aspheric | 63.2537 | 0.2336 | 1.67 | 20.4 | 99.0000 |
| S4 | aspheric | 3.3875 | 0.4840 | | | 5.6013 |
| S5 | aspheric | 37.5835 | 0.2245 | 1.55 | 56.1 | −99.0000 |
| S6 | aspheric | 4.9417 | 0.5189 | | | −8.5851 |
| S7 | aspheric | 12160.1400 | 0.3462 | 1.65 | 23.5 | 99.0000 |
| S8 | aspheric | −5.9176 | 0.1003 | | | 21.7627 |
| S9 | aspheric | −2.2708 | 0.2067 | 1.55 | 56.1 | 3.2108 |
| S10 | aspheric | −11.3815 | 0.8688 | | | 11.6369 |
| S11 | aspheric | −5.2026 | 0.7040 | 1.55 | 56.1 | −42.3966 |
| S12 | aspheric | −11.4616 | 0.2720 | | | 15.2044 |
| S13 | spherical | infinite | 0.1100 | 1.52 | 64.2 | |
| S14 | spherical | infinite | 0.4150 | | | |
| S15 | spherical | infinite | | | | |

As can be seen from Table 19, in example 7, the object-side surface and the image-side surface of any one of the first lens E1 to the sixth lens E6 are aspheric. Table 20 shows high-order coefficients applicable to each aspheric surface in example 7, wherein the surface shape of each aspheric surface may be defined by the formula (1) given in the above example 1.

TABLE 21

| f1 (mm) | 2.50 | f6 (mm) | −18.15 |
|---|---|---|---|
| f2 (mm) | −5.37 | f (mm) | 5.99 |
| f3 (mm) | −10.44 | TTL (mm) | 5.41 |
| f4 (mm) | 9.17 | HFOV (°) | 24.0 |
| f5 (mm) | −5.23 | | |

TABLE 20

| Surface number | A4 | A6 | A8 | A10 | A12 |
|---|---|---|---|---|---|
| S1 | −7.6800E−03 | −9.8900E−03 | 2.9621E−02 | −9.9080E−02 | 1.8096E−01 |
| S2 | 3.8499E−02 | −2.8790E−02 | 8.2788E−02 | −1.7719E−01 | 2.3175E−01 |
| S3 | 3.7339E−02 | 1.2174E−02 | 6.4553E−02 | −1.5710E−01 | 1.0184E−01 |
| S4 | 1.9274E−02 | 7.4200E−02 | −9.4040E−02 | 4.6794E−01 | −1.4671E+00 |
| S5 | 5.6174E−02 | 9.6560E−02 | 3.8259E−01 | −2.1246E+00 | 6.1582E+00 |
| S6 | −1.3590E−02 | 1.7114E−01 | −4.4088E−01 | 1.8177E+00 | −5.4216E+00 |
| S7 | −2.0709E−01 | −2.6925E−01 | 9.2728E−01 | −4.1921E+00 | 1.0678E+01 |
| S8 | −1.3564E−01 | −2.9697E−01 | 1.0032E+00 | −3.1505E+00 | 7.7141E+00 |
| S9 | 4.3101E−02 | −1.6864E−01 | 6.8288E−01 | −1.5895E+00 | 3.4512E+00 |
| S10 | 5.0265E−02 | −2.2460E−02 | 1.6186E−01 | −3.8467E−01 | 4.0989E−01 |
| S11 | −7.4760E−02 | 2.8899E−02 | −2.7200E−03 | −9.0000E−04 | 6.1900E−04 |
| S12 | −5.9750E−02 | 3.4220E−03 | 2.3230E−03 | −6.4000E−04 | −3.9000E−04 |

| Surface number | A14 | A16 | A18 | A20 |
|---|---|---|---|---|
| S1 | −2.0051E−01 | 1.3209E−01 | −4.7910E−02 | 7.4230E−03 |
| S2 | −1.9922E−01 | 1.1545E−01 | −4.1450E−02 | 7.0580E−03 |
| S3 | 5.1506E−02 | −1.1692E−01 | 6.6856E−02 | −1.3400E−02 |
| S4 | 2.4798E+00 | −2.3880E+00 | 1.2205E+00 | −2.5692E−01 |
| S5 | −1.0740E+01 | 1.1292E+01 | −6.5705E+00 | 1.6387E+00 |
| S6 | 1.0318E+01 | −1.1865E+01 | 7.5596E+00 | −2.0315E+00 |
| S7 | −1.6849E+01 | 1.5528E+01 | −8.0255E+00 | 1.9367E+00 |
| S8 | −1.2495E+01 | 1.1976E+01 | −6.1355E+00 | 1.3046E+00 |
| S9 | −5.9464E+00 | 6.1531E+00 | −3.2934E+00 | 7.0283E−01 |
| S10 | −2.4285E−01 | 8.2984E−02 | −1.5330E−02 | 1.1860E−03 |
| S11 | −2.3000E−04 | 4.9100E−05 | −5.3000E−06 | 2.2500E−07 |
| S12 | 2.9000E−04 | −8.6000E−05 | 1.3000E−05 | −8.0000E−07 |

Table 21 shows effective focal lengths f1 to f6 of respective lens, a total effective focal length f of the optical imaging lens assembly, a total track length TTL and half of a maximal field-of-view HFOV in example 7.

Figures 14A, 14B:
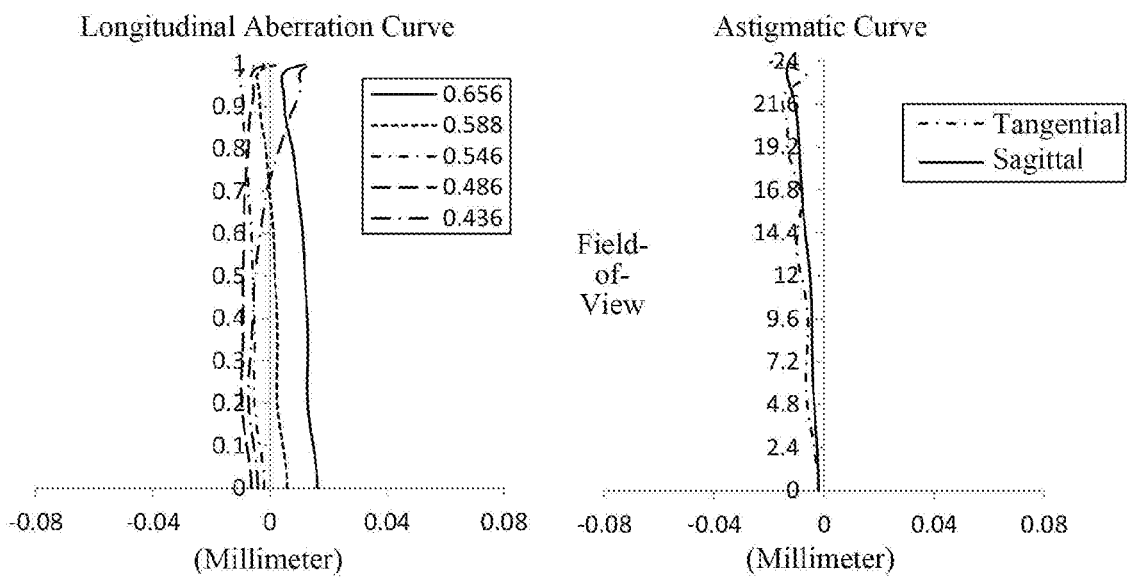
FIG. 14A illustrates a longitudinal aberration curve of the optical imaging lens assembly of the Example 7.
FIG. 14B illustrates an astigmatic curve of the optical imaging lens assembly of the Example 7.
Figures 14C, 14D:
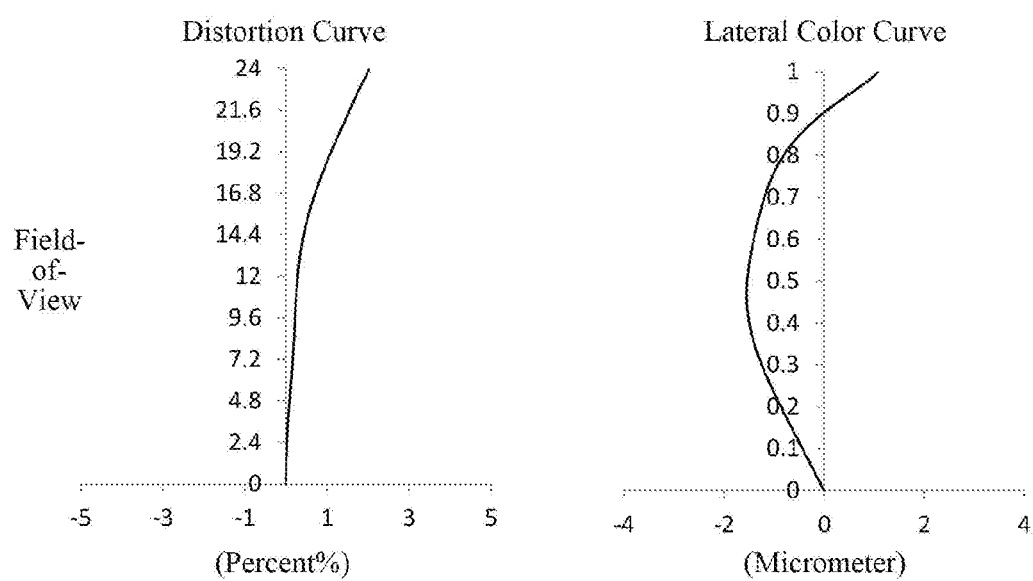
FIG. 14C illustrates a distortion curve of the optical imaging lens assembly of the Example 7.
FIG. 14D illustrates a lateral color curve of the optical imaging lens assembly of the Example 7.

FIG. 14A illustrates a longitudinal aberration curve of the optical imaging lens assembly according to example 7, representing deviations of focal points converged by light of different wavelengths after passing through the optical imaging lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion at different image heights. FIG. 14D illustrates a lateral color curve of the optical imaging lens assembly according to example 7, representing deviations of different image heights on an imaging plane after light passes through the optical imaging lens assembly. It can be seen from FIG. 14A to FIG. 14D that the optical imaging lens assembly provided in example 7 may achieve good image quality.

In view of the above, examples 1 to 7 respectively satisfy the relationship shown in Table 22.

TABLE 22

| Condition | Example | | | | | | |
|---|---|---|---|---|---|---|---|
| | 1 | 2 | 3 | 4 | 5 | 6 | 7 |
| TTL/f | 0.90 | 0.90 | 0.90 | 0.91 | 0.90 | 0.90 | 0.90 |
| f3/f | −2.06 | −2.21 | −2.66 | −1.77 | −1.76 | −1.80 | −1.74 |
| f3/f1 | −4.91 | −5.29 | −6.31 | −4.35 | −4.25 | −4.34 | −4.18 |
| f2/R4 | −1.54 | −1.56 | −1.48 | −1.72 | −1.49 | −1.63 | −1.59 |
| f/f5 | −1.00 | −1.03 | −0.61 | −1.38 | −1.09 | −1.07 | −1.15 |
| f1/R1 | 1.63 | 1.61 | 1.60 | 1.58 | 1.55 | 1.56 | 1.56 |
| R8/R2 | 0.38 | 0.48 | 0.63 | 0.46 | 0.55 | 0.53 | 0.79 |
| R9/R12 | 0.31 | 0.29 | 0.16 | 0.40 | 0.18 | 0.21 | 0.20 |
| tan(HFOV) | 0.45 | 0.45 | 0.44 | 0.43 | 0.44 | 0.44 | 0.44 |
| CT6/CT4 | 2.27 | 2.09 | 1.56 | 2.04 | 1.76 | 1.73 | 2.03 |
| ET5/CT5 | 2.13 | 2.60 | 2.71 | 2.44 | 2.52 | 2.43 | 2.64 |
| f12/CT1 | 4.01 | 4.08 | 4.21 | 4.20 | 4.29 | 4.27 | 4.36 |
| T56/T34 | 2.23 | 2.11 | 1.81 | 1.55 | 1.70 | 1.74 | 1.67 |
| R6/R11 | −1.11 | −1.22 | −1.69 | −0.90 | −1.02 | −1.30 | −0.95 |

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, and a sixth lens, which are sequentially arranged from an object side to an image side of the optical imaging lens assembly along an optical axis,
wherein,
the first lens has a positive refractive power;
the second lens has a negative refractive power;
the third lens has a negative refractive power;
the fourth lens has a refractive power, and an image-side surface of the fourth lens is a convex surface;
the fifth lens has a negative refractive power, and an object-side surface of the fifth lens is a concave surface; and
the sixth lens has a refractive power, and an object-side surface of the sixth lens is a concave surface;
wherein −3<f3/f<−1.5, where f3 is an effective focal length of the third lens and f is an effective focal length of the optical imaging lens assembly;
1.5<T56/T34<2.5, where T56 is a spaced interval between the fifth lens and the sixth lens along the optical axis and T34 is a spaced interval between the third lens and the fourth lens along the optical axis; and
4<f12/CT1<5, where f12 is a combined focal length of the first lens and the second lens and CT1 is a center thickness of the first lens along the optical axis.

2. The optical imaging lens assembly according to claim 1, wherein TTL/f<1,
where f is the total effective focal length of the optical imaging lens assembly and TTL is a distance along the optical axis from an object-side surface of the first lens to an imaging plane of the optical imaging lens assembly.

3. The optical imaging lens assembly according to claim 1, wherein an image-side surface of the second lens is a concave surface, and
wherein −2<f2/R4<−1, where f2 is an effective focal length of the second lens and R4 is a radius of curvature of the image-side surface of the second lens.

4. The optical imaging lens assembly according to claim 1, wherein −1.5<f/f5<−0.5,
where f is the total effective focal length of the optical imaging lens assembly and f5 is an effective focal length of the fifth lens.

5. The optical imaging lens assembly according to claim 1, wherein an object-side surface of the first lens is a convex surface, and
wherein 1<f1/R1<2, where f1 is an effective focal length of the first lens and R1 is a radius of curvature of the object-side surface of the first lens.

6. The optical imaging lens assembly according to claim 1, wherein an image-side surface of the first lens is a convex surface, and
wherein 0<R8/R2<1, where R2 is a radius of curvature of the image-side surface of the first lens and R8 is a radius of curvature of the image-side surface of the fourth lens.

7. The optical imaging lens assembly according to claim 1, wherein an image-side surface of the sixth lens is a convex surface, and
wherein 0<R9/R12<1, where R9 is a radius of curvature of the object-side surface of the fifth lens and R12 is a radius of curvature of the image-side surface of the sixth lens.

8. The optical imaging lens assembly according to claim 4, wherein 2<ET5/CT5<3,
where ET5 is an edge thickness at a maximum effective radius of the fifth lens and CT5 is a center thickness of the fifth lens along the optical axis.

9. The optical imaging lens assembly according to claim 1, wherein an image-side surface of the third lens is a concave surface, and
wherein −1.8<R6/R11<−0.8, where R6 is a radius of curvature of the image-side surface of the third lens and R11 is a radius of curvature of the object-side surface of the sixth lens.

10. The optical imaging lens assembly according to claim 1, wherein tan(HFOV)<0.5, where HFOV is half of a maximal field-of-view of the optical imaging lens assembly.

11. An optical imaging lens assembly, comprising: a first lens, a second lens, a third lens, a fourth lens, a fifth lens, and a sixth lens, which are sequentially arranged from an object side to an image side of the optical imaging lens assembly along an optical axis, wherein, the first lens has a positive refractive power;

the second lens has a negative refractive power;

the third lens has a negative refractive power;

the fourth lens has a refractive power, and an image-side surface of the fourth lens is a convex surface;

the fifth lens has a negative refractive power, and an object-side surface of the fifth lens is a concave surface; and the sixth lens has a refractive power, and an object-side surface of the sixth lens is a concave surface;

wherein $-7<f3/f1<-4$, where f3 is an effective focal length of the third lens and f1 is an effective focal length of the first lens; and $4<f12/CT1<5$, where f12 is a combined focal length of the first lens and the second lens and CT1 is a center thickness of the first lens along the optical axis.

12. The optical imaging lens assembly according to claim 11, wherein $1.5<T56/T34<2.5$, where T56 is a spaced interval between the fifth lens and the sixth lens along the optical axis and T34 is a spaced interval between the third lens and the fourth lens along the optical axis.

13. The optical imaging lens assembly according to claim 12, wherein an image-side surface of the sixth lens is a convex surface, and wherein $0<R9/R12<1$, where R9 is a radius of curvature of the object-side surface of the fifth lens and R12 is a radius of curvature of the image-side surface of the sixth lens.

14. The optical imaging lens assembly according to claim 12, wherein $1.5<CT6/CT4<2.5$, where CT6 is a center thickness of the sixth lens along the optical axis and CT4 is a center thickness of the fourth lens along the optical axis.

15. The optical imaging lens assembly according to claim 11, wherein $2<ET5/CT5<3$, where ET5 is an edge thickness at a maximum effective radius of the fifth lens and CT5 is a center thickness of the fifth lens along the optical axis.

16. The optical imaging lens assembly according to claim 15, wherein $-1.5<f/f5<-0.5$, where f is a total effective focal length of the optical imaging lens assembly and f5 is an effective focal length of the fifth lens.

17. The optical imaging lens assembly according to claim 11, wherein $\tan(HFOV)<0.5$, where HFOV is half of a maximal field-of-view of the optical imaging lens assembly.

* * * * *